US009835904B2

(12) United States Patent
Katsuta et al.

(10) Patent No.: US 9,835,904 B2
(45) Date of Patent: Dec. 5, 2017

(54) LIQUID CRYSTAL DISPLAY DEVICE

(71) Applicant: Sharp Kabushiki Kaisha, Osaka-shi, Osaka (JP)

(72) Inventors: Shohei Katsuta, Osaka (JP); Tsuyoshi Maeda, Osaka (JP); Hideomi Yui, Osaka (JP); Emi Yamamoto, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 190 days.

(21) Appl. No.: 14/646,773

(22) PCT Filed: Nov. 19, 2013

(86) PCT No.: PCT/JP2013/081167
§ 371 (c)(1),
(2) Date: May 22, 2015

(87) PCT Pub. No.: WO2014/080907
PCT Pub. Date: May 30, 2014

(65) Prior Publication Data
US 2015/0286101 A1    Oct. 8, 2015

(30) Foreign Application Priority Data
Nov. 22, 2012 (JP) .................................. 2012-256173

(51) Int. Cl.
*G02F 1/1337*    (2006.01)
*G02F 1/1335*    (2006.01)
(52) U.S. Cl.
CPC .. *G02F 1/133753* (2013.01); *G02F 1/133504* (2013.01); *G02F 1/133528* (2013.01);
(Continued)
(58) Field of Classification Search
CPC ... G02F 1/133753; G02F 2001/133757; G02F 2001/133742; G02F 1/133504
See application file for complete search history.

(56) References Cited

U.S. PATENT DOCUMENTS

2003/0227429 A1* 12/2003 Shimoshikiryo . G02F 1/134336
345/90
2009/0322662 A1   12/2009 Yoshida et al.
(Continued)

FOREIGN PATENT DOCUMENTS

JP        2006-113208 A    4/2006
JP    WO 2012086424 A1 *  6/2012    ....... G02F 1/133504
(Continued)

OTHER PUBLICATIONS

English translation of Official Communication issued in corresponding International Application PCT/JP2013/081167, mailed on Feb. 10, 2014.

*Primary Examiner* — Jia Pan
(74) *Attorney, Agent, or Firm* — Keating & Bennett, LLP

(57) ABSTRACT

A liquid crystal display device includes: a liquid crystal panel; an illuminating device; and a light control member that is disposed on a light emission side of the liquid crystal panel. The light control member diffuses light that is emitted from the liquid crystal panel in an anisotropic manner in a first azimuth angle direction viewed from a normal direction of the liquid crystal panel to control an emission direction of the light. A pixel includes a first region in which a director of liquid crystal molecules is in a first direction, and a second region in which the director of the liquid crystal molecules is in a second orientation opposite to the first orientation in the first direction. A second azimuth angle direction in which light-diffusibility of the light control member is relatively strong, and the first direction approximately match each other.

10 Claims, 20 Drawing Sheets

(52) U.S. Cl.
CPC ............ *G02F 1/133602* (2013.01); *G02F 2001/133562* (2013.01); *G02F 2001/133742* (2013.01); *G02F 2001/133757* (2013.01)

(56) References Cited

U.S. PATENT DOCUMENTS

| | | | | |
|---|---|---|---|---|
| 2010/0305230 A1* | 12/2010 | Li | .................. | C08F 120/18 522/62 |
| 2011/0279745 A1* | 11/2011 | Yamamoto | ........ | G02F 1/133753 349/33 |
| 2012/0086743 A1* | 4/2012 | Shiomi | ............ | G02F 1/136213 345/694 |
| 2013/0265774 A1* | 10/2013 | Umeda | ............ | G02F 1/133504 362/311.01 |
| 2013/0329401 A1* | 12/2013 | Yamamoto | ........... | G02B 5/0247 362/97.2 |
| 2014/0160410 A1* | 6/2014 | Yamamoto | ....... | B29D 11/00798 349/112 |

FOREIGN PATENT DOCUMENTS

| | | |
|---|---|---|
| WO | 2008/090845 A1 | 7/2008 |
| WO | 2010/087047 A1 | 8/2010 |
| WO | 2012/086424 A1 | 6/2012 |

* cited by examiner

LIQUID CRYSTAL DISPLAY DEVICE

TECHNICAL FIELD

The present invention relates to a liquid crystal display device.

Priority is claimed on Japanese Patent Application No. 2012-256173, filed Nov. 22, 2012, the content of which is incorporated herein by reference.

BACKGROUND ART

A liquid crystal display device has been widely used as a display of a portable electronic apparatus including a portable telephone, a television, a personal computer, and the like. In general, when a display screen is viewed from a front elevation side, the liquid crystal display device exhibits excellent display characteristics. On the other hand, when the display screen is viewed from an inclined direction, contrast decreases, and thus visibility is apt to deteriorate. Alternatively, gray scale reversal in which brightness is reversed during gradation display, and the like may occur in some cases. According to this, various methods of broadening a viewing angle range, at which a screen can be observed with satisfactory visibility, have been suggested.

For example, PTL 1 discloses a vertical alignment (VA) mode liquid crystal display device and a multi-domain vertical alignment mode (MVA) liquid crystal display device which are excellent in regard to viewing angle characteristics.

CITATION LIST

Patent Literature

PTL 1: Japanese Unexamined Patent Application Publication No. 2006-113208

SUMMARY OF INVENTION

Technical Problem

In the case of a VA mode liquid crystal display device in which the number of domains in one pixel is set to 2, average directions (director) of a major axis of liquid crystal molecules in each domain are different from each other by 180° during application of a voltage. When assuming that the liquid crystal molecules fall down a right and left direction of the liquid crystal display device, in a case of obliquely viewing the liquid crystal display device from an upper and lower direction, a display image does not greatly vary in comparison to a case of viewing the liquid crystal display device from a front elevation side. On the other hand, in a case of obliquely viewing the liquid crystal display device from a right and left direction, color variation in a display image is greater in comparison to the case of viewing the liquid crystal display device from a front elevation side. In other words, in a case of viewing the liquid crystal display device by changing a polar angle in a major axis direction of liquid crystal molecules during application of a voltage, an amount of shift in gamma characteristics (gradation-luminance characteristics) is great. That is, it can be said that the VA mode liquid crystal display device having two domains in one pixel has an azimuth angle with high viewing-angle dependency.

The invention has been made to solve the above-described problem, and an object thereof is to provide a liquid crystal display device having low viewing-angle dependency.

Solution to Problem

To accomplish the above-described object, according to an aspect of the invention, there is provided a liquid crystal display device including: a liquid crystal panel including a first substrate having a first vertical alignment film, a second substrate having a second vertical alignment film, a liquid crystal layer which is interposed between the first vertical alignment film and the second vertical alignment film and has negative dielectric anisotropy, a first polarizing plate that is disposed on a light incidence side of the liquid crystal layer, and a second polarizing plate that is disposed on a light emission side of the liquid crystal layer; an illuminating device which is disposed on a light incidence side of the liquid crystal panel, and emits light toward the liquid crystal panel; and a light control member which is disposed on a light emission side of the liquid crystal panel, and diffuses light that is emitted from the liquid crystal panel in an anisotropic manner in an azimuth angle direction viewed from a normal direction of the liquid crystal panel so as to control an emission direction of the light. The liquid crystal panel includes a plurality of pixels, each being a basic unit of display. The pixel includes a first region in which a director of liquid crystal molecules at the central portion in a thickness direction of the liquid crystal layer during application of a voltage heads for a first orientation in a first direction, and a second region in which the director of the liquid crystal molecules at the central portion in the thickness direction of the liquid crystal layer during application of a voltage heads for a second orientation opposite to the first orientation in the first direction. An azimuth angle direction in which light-diffusibility of the light control member is relatively strong, and the first direction approximately match each other.

In the liquid crystal display device according to the aspect of the invention, the light control member may include a light-transmissive base material, a light-diffusing portion that is formed on a first surface of the base material, and a light-shielding portion that is formed in a region on the first surface of the base material other than a region in which the light-diffusing portion is formed, the light-diffusing portion may have a light-emitting end surface that is located on a base material side, a light-incident end surface which is located on a side opposite to the base material side, and has an area larger than an area of the light-emitting end surface, and an inclined surface that is located between the light-emitting end surface and the light-incident end surface, a height of the light-diffusing portion from the light-incident end surface to the light-emitting end surface may be higher than a height of the light-shielding portion, and a material having a refractive index, which is lower than a refractive index of the light-diffusing portion, may exist in a gap between light-diffusing portions which is in a region in which each of the light-diffusing portions is not formed.

In the liquid crystal display device according to the aspect of the invention, a planar shape of the light-shielding portion when viewed from a normal direction of the base material may be an anisotropic shape having a major axis and a minor axis.

In the liquid crystal display device according to the aspect of the invention, the planar shape may be an elliptical shape.

In the liquid crystal display device according to the aspect of the invention, a ratio of a major axis dimension to a minor axis dimension in the elliptical shape may be 1.1 to 2.5.

In the liquid crystal display device according to the aspect of the invention, the planar shape may be a polygonal shape that is inscribed in an ellipse.

In the liquid crystal display device according to the aspect of the invention, an angle made by the light-incident end surface and the inclined surface of the light-diffusing portion may be 80°±5°.

In the liquid crystal display device according to the aspect of the invention, a ratio of an occupation area of the light-shielding portion to a total area of the first surface of the base material may be 30%±10%.

In the liquid crystal display device according to the aspect of the invention, the pixel may include at least a first sub-pixel and a second sub-pixel which are capable of individually controlling an application voltage to the liquid crystal layer.

In the liquid crystal display device according to the aspect of the invention, the first vertical alignment film and the second vertical alignment film may be optical alignment films.

Advantageous Effects of Invention

According to the aspects of the invention, it is possible to provide a liquid crystal display device having low viewing-angle dependency without application of a complicated circuit structure.

DESCRIPTION OF EMBODIMENTS

[First Embodiment]

Hereinafter, an embodiment of the invention will be described with reference to FIG. 1 to FIG. 12D.

In this embodiment, a liquid crystal display device provided with a transmissive liquid crystal panel will be described as an example.

In addition, in the following drawings, so as to improve visibility of respective constituent elements, dimensional scales may be made different in accordance with the constituent elements.

Figure 1:
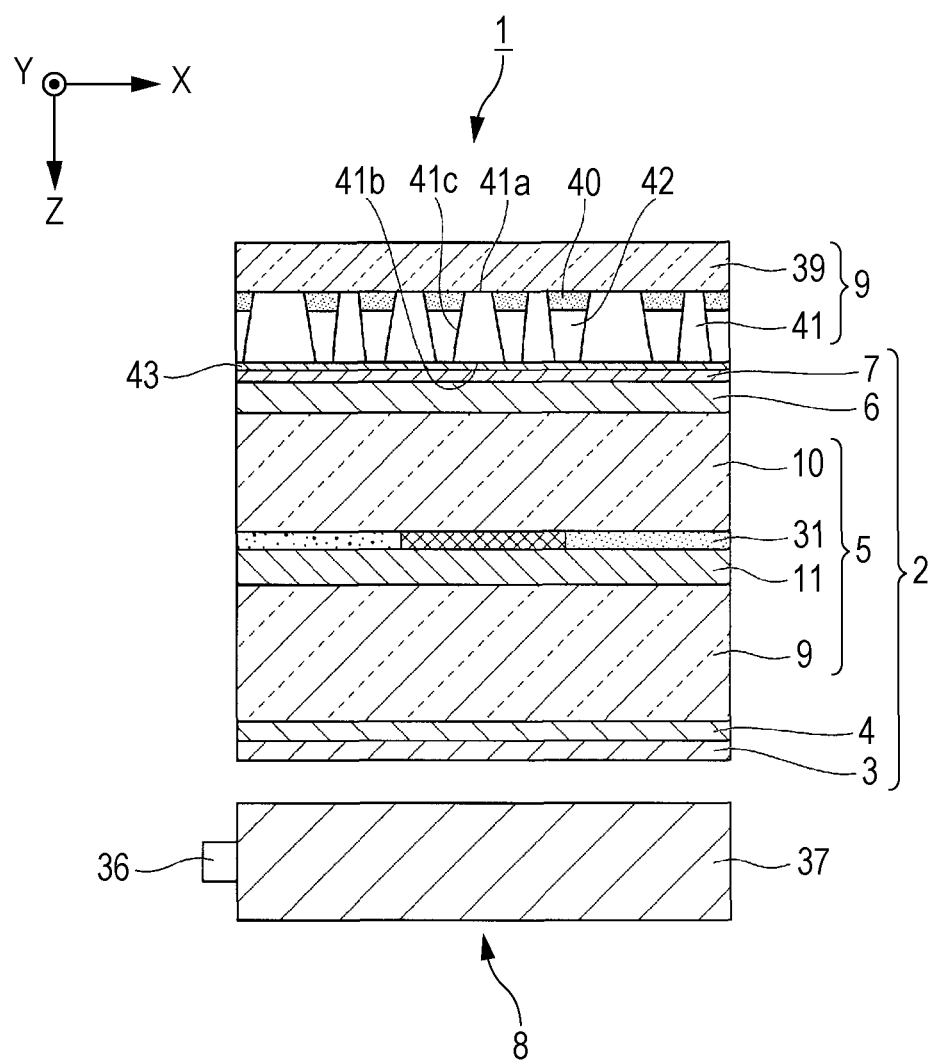
FIG. 1 is a view illustrating a liquid crystal display device according to a first embodiment of the invention.

FIG. 1 is a cross-sectional view of a liquid crystal display device 1 of this embodiment.

As illustrated in FIG. 1, the liquid crystal display device 1 of this embodiment includes a liquid crystal panel 2, a backlight 8 (illuminating device), and a light control member 9 (light control member). The liquid crystal panel 2 includes a first polarizing plate 3, a first phase difference film 4 (phase difference plate), a liquid crystal cell 5, a second phase difference film 6 (phase difference plate), and a second polarizing plate 7. In FIG. 1, the liquid crystal cell 5 is schematically illustrated, but a detailed structure thereof will be described later.

An observer views a display image of the liquid crystal display device 1 through the light control member 9. In the following description, a side in which the light control member 9 is disposed is referred to as a visual recognition side. A side in which the backlight 8 is disposed is referred to as a rear surface side. In addition, in the following description, an x-axis is defined as a horizontal direction of a screen of a liquid crystal display device. A y-axis is defined as a vertical direction of the screen of the liquid crystal display device. A z-axis is defined as a thickness direction of the liquid crystal display device.

In the liquid crystal display device 1 of this embodiment, light that is emitted from the backlight 8 is modulated in the liquid crystal panel 2, and a predetermined image, characters, and the like are displayed by the modulated light. In addition, when light that is emitted from the liquid crystal panel 2 is transmitted through the light control member 9, light is emitted from the light control member 9 in a state in which light distribution of the emitted light is further spread out in comparison to light distribution prior to incidence into the light control member 9. According to this, the observer can visually recognize display with a wide viewing angle.

Hereinafter, a specific configuration of the liquid crystal panel 2 will be described.

Here, an active matrix type transmissive liquid crystal panel will be described as an example. However, a liquid crystal panel that is applicable to this embodiment is not limited to the active matrix type transmissive liquid crystal panel. For example, the liquid crystal panel that is applicable to this embodiment may be a transflective (transmissive and reflective) liquid crystal panel. In addition, the liquid crystal panel may be a liquid crystal panel of a simple matrix type in which each pixel is not provided with a thin film transistor (hereinafter, abbreviated as a TFT) for switching.

Figure 2:
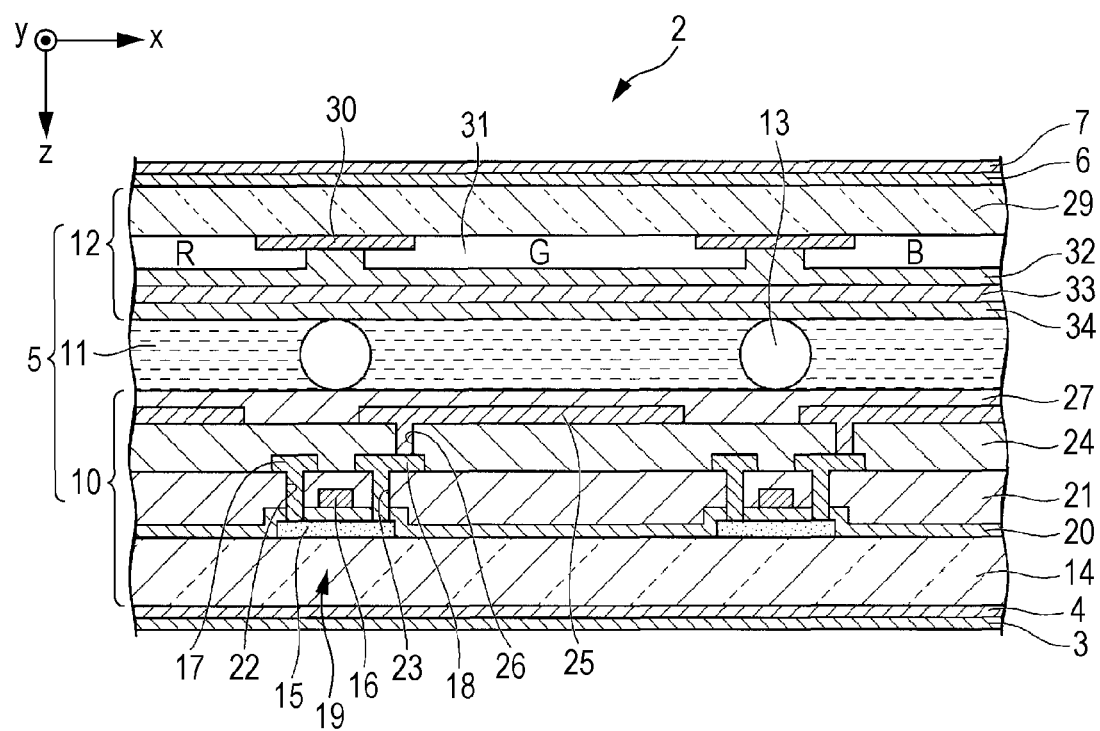
FIG. 2 is a longitudinal cross-sectional view of a liquid crystal panel according to the first embodiment of the invention.

FIG. 2 is a longitudinal cross-sectional view of the liquid crystal panel 2.

As illustrated in FIG. 2, the liquid crystal cell 5 includes a TFT substrate 10, a color filter substrate 12, and a liquid crystal layer 11. The TFT substrate 10 functions as a switching element substrate. The color filter substrate 12 is disposed to face the TFT substrate 10. The liquid crystal layer 11 is interposed between the TFT substrate 10 and the color filter substrate 12.

The liquid crystal layer 11 is enclosed in a space surrounded by the TFT substrate 10, the color filter substrate 12, and a frame-shaped sealing member (not illustrated). The sealing member bonds the TFT substrate 10 and the color filter substrate 12 with a predetermined gap therebetween.

For example, the liquid crystal panel 2 of this embodiment performs display in a vertical alignment (VA) mode.

A liquid crystal having negative dielectric anisotropy is used in the liquid crystal layer 11. A spacer 13 is disposed between the TFT substrate 10 and the color filter substrate 12. The spacer 13 has a spherical shape or a columnar shape. The spacer 13 maintains a constant gap between the TFT substrate 10 and the color filter substrate 12.

Although not illustrated, a plurality of pixels are arranged in the TFT substrate 10 in a matrix shape.

Each of the pixels is a basic unit of display. In the TFT substrate 10, a plurality of source bus lines are formed to extend in parallel with each other. In the TFT substrate 10, a plurality of gate bus lines are formed to extend in parallel with each other. The plurality of gate bus lines are perpendicular to the plurality of source bus lines. The plurality of source bus lines and the plurality of gate bus lines are formed on the TFT substrate 10 in a lattice shape. A rectangular region, which is partitioned by the source bus lines adjacent to each other, and the gate bus lines adjacent to each other, becomes one pixel. Each of the source bus lines is connected to a source electrode 17 of the TFT 19. Each of the gate bus lines is connected to a gate electrode 16 of the TFT 19.

The TFT 19, which includes a semiconductor layer 15, the gate electrode 16, the source electrode 17, a drain electrode 18, and the like, is formed on a surface on a liquid crystal layer 11 side of a transparent substrate 14 that constitutes the TFT substrate 10. As the transparent substrate 14, for example, a glass substrate may be used.

The semiconductor layer 15 is formed on the transparent substrate 14. As a material of the semiconductor layer 15, for example, a semiconductor material such as continuous grain silicon (CGS), low-temperature poly-silicon (LPS), and α-Si (amorphous silicon) is used.

A gate insulating film 20 is formed on the transparent substrate 14 so as to cover the semiconductor layer 15.

As a material of the gate insulating film 20, for example, a silicon oxide film, a silicon nitride film, a laminated film of these films, and the like are used.

The gate electrode 16 is formed on the gate insulating film 20 so as to face the semiconductor layer 15. As a material of the gate electrode 16, for example, a laminated film of tungsten (W)/tantalum nitride (TaN), molybdenum (Mo), titanium (Ti), aluminum (Al), and the like are used.

A first interlayer insulating film 21 is formed on the gate insulating film 20 so as to cover the gate electrode 16. As a material of the first interlayer insulating film 21, for example, a silicon oxide film, a silicon nitride film, a laminated film of these films, and the like are used.

The source electrode 17 and the drain electrode 18 are formed on the first interlayer insulating film 21. A contact hole 22 and a contact hole 23 are formed in the first interlayer insulating film 21 and the gate insulating film 20 so as to pass through the first interlayer insulating film 21 and the gate insulating film 20.

The source electrode 17 is connected to a source region of the semiconductor layer 15 through the contact hole 22. The drain electrode 18 is connected to a drain region of the semiconductor layer 15 through the contact hole 23. As a material of the source electrode 17 and the drain electrode 18, the same conductive material as that of the gate electrode 16 is used.

A second interlayer insulating film 24 is formed on the first interlayer insulating film 21 so as to cover the source electrode 17 and the drain electrode 18. As a material of the second interlayer insulating film 24, the same material as that of the first interlayer insulating film 21, or an organic insulating material is used.

A pixel electrode 25 is formed on the second interlayer insulating film 24. A contact hole 26 is formed in the second interlayer insulating film 24 so as to pass through the second interlayer insulating film 24. The pixel electrode 25 is connected to the drain electrode 18 through the contact hole 26. The pixel electrode 25 is connected to the drain region of the semiconductor layer 15 by using the drain electrode 18 as a relay electrode.

As a material of the pixel electrode 25, for example, a transparent conductive material such as indium tin oxide (ITO) and indium zinc oxide (IZO) is used.

According to the configuration, when a scanning signal is supplied through the gate bus line, and thus the TFT 19 enters an on-state, an image signal that is supplied to the source electrode 17 through the source bus line is supplied to the pixel electrode 25 through the semiconductor layer 15 and the drain electrode 18. In addition, the TFT 19 may be a top gate type TFT that is illustrated in FIG. 2, or a bottom gate type TFT.

In addition, a first vertical alignment film 27 is formed on the entire surface of the second interlayer insulating film 24 so as to cover the pixel electrode 25. The first vertical alignment film 27 has an alignment regulation function of vertically aligning liquid crystal molecules which constitute the liquid crystal layer 11. The first vertical alignment film 27 is a so-called vertical alignment film. In this embodiment, an alignment treatment is performed with respect to the first vertical alignment film 27 by using a photo-alignment technology. That is, in this embodiment, a photo-alignment film is used as the first vertical alignment film 27.

On the other hand, a black matrix 30, a color filter 31, a planarization layer 32, a counter electrode 33, and a second vertical alignment film 34 are sequentially formed on a surface on a liquid crystal layer 11 side of the transparent substrate 29 that constitutes the color filter substrate 12.

The black matrix 30 has a function of blocking transmission of light in a region between pixels. For example, the black matrix 30 is formed from a metal such as chromium (Cr) and a multi-layer film of Cr/Cr oxide, or a photoresist obtained by dispersing carbon particles in a photosensitive resin.

Dyes of respective colors of red (R), green (G), and blue (B) are included in the color filter 31. The color filter 31 of any one of R, G, and B is disposed to face one pixel electrode 25 on the TFT substrate 10. In addition, the color filter 31 may have a multi-color configuration of three or more colors including R, G, and B.

The planarization layer 32 is constituted as an insulating film that covers the black matrix 30 and the color filter 31. The planarization layer 32 has a function of mitigating and planarizing a step difference, which occurs due to the black matrix 30 and the color filter 31.

The counter electrode 33 is formed on the planarization layer 32. As a material of the counter electrode 33, the same transparent conductive material as that of the pixel electrode 25 is used.

The second vertical alignment film 34 is formed on the entire surface of the counter electrode 33. The second vertical alignment film 34 has an alignment regulation function of vertically aligning the liquid crystal molecules which constitute the liquid crystal layer 11. The second vertical alignment film 34 is a so-called vertical alignment film. In this embodiment, an alignment treatment is performed with respect to the second vertical alignment film 34 by using photo-alignment technology. That is, in this embodiment, a photo-alignment film is used as the second vertical alignment film 34.

Returning to FIG. 1, the backlight 8 that is an illuminating device includes a light source 36 and a light guide body 37. The light source 36 is disposed on an end surface of the light guide body 37. As the light source 36, for example, a light-emitting diode, a cold-cathode tube, and the like are used.

The backlight 8 of this embodiment is an edge light type backlight.

The light guide body 37 has a function of guiding light, which is emitted from the light source 36, to the liquid crystal panel 2. As a material of the light guide body 37, for example, a resin material such as an acrylic resin is used.

Light, which is incident to the end surface of the light guide body 37 from the light source 36, propagates while being totally reflected at the inside of the light guide body 37, and is emitted from an upper surface (light emission surface) of the light guide body 37 with an approximately uniform intensity. Although not illustrated, a scattering sheet and a prism sheet are disposed on the upper surface of the light guide body 37, and a scattering sheet is disposed on a lower surface of the light guide body 37. The light, which is emitted from the upper surface of the light guide body 37, is scattered by the scattering sheet and is condensed by the prism sheet, and is emitted in an approximately parallelized manner.

As the scattering sheet, white PET may be used. As the prism sheet, for example, BEF (product name) manufactured by Sumitomo 3M Limited is used.

In this embodiment, it is not desirable for the backlight 8 to have directivity. As the backlight 8 of this embodiment, a backlight (hereinafter, may be referred to as a typical backlight) in which the light emission direction is controlled and thus directivity is moderately set to a certain extent is used. However, in this embodiment, the backlight 8 may have directivity.

The first polarizing plate 3 is provided between the backlight 8 and the liquid crystal cell 5. The first polarizing plate 3 functions as a polarizer. The second polarizing plate 7 is provided between the liquid crystal cell 5 and the light control member 9. The second polarizing plate 7 functions as a polarizer. A transmission axis of the first polarizing plate 3 and a transmission axis of the second polarizing plate 7 are arranged in a cross-nicol arrangement.

A first phase difference film 4, which compensates for a phase difference in light, is provided between the first polarizing plate 3 and the liquid crystal cell 5. A second phase difference film 6, which compensates for the phase difference in light, is provided between the second polarizing plate 7 and the liquid crystal cell 5.

As the phase difference films (the first phase difference film 4 and the second phase difference film 6) of this embodiment, a WV film manufactured by Fujifilm Corporation is used.

Next, the light control member 9 will be described in detail.

Figure 3:
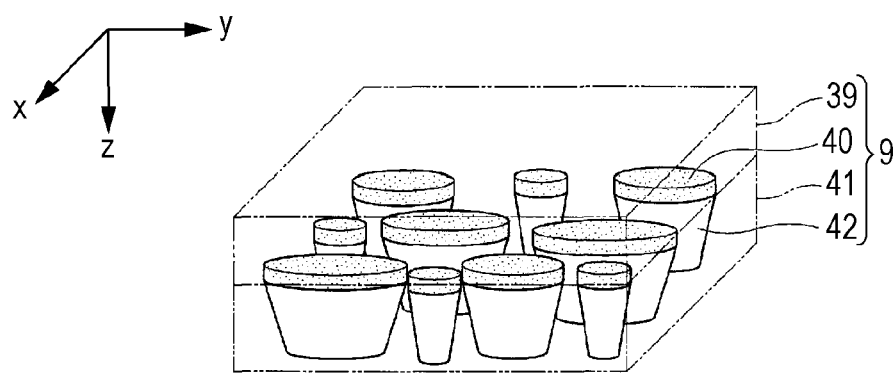
FIG. 3 is a perspective view when viewing a light control member from a visual recognition side.
Figure 4:
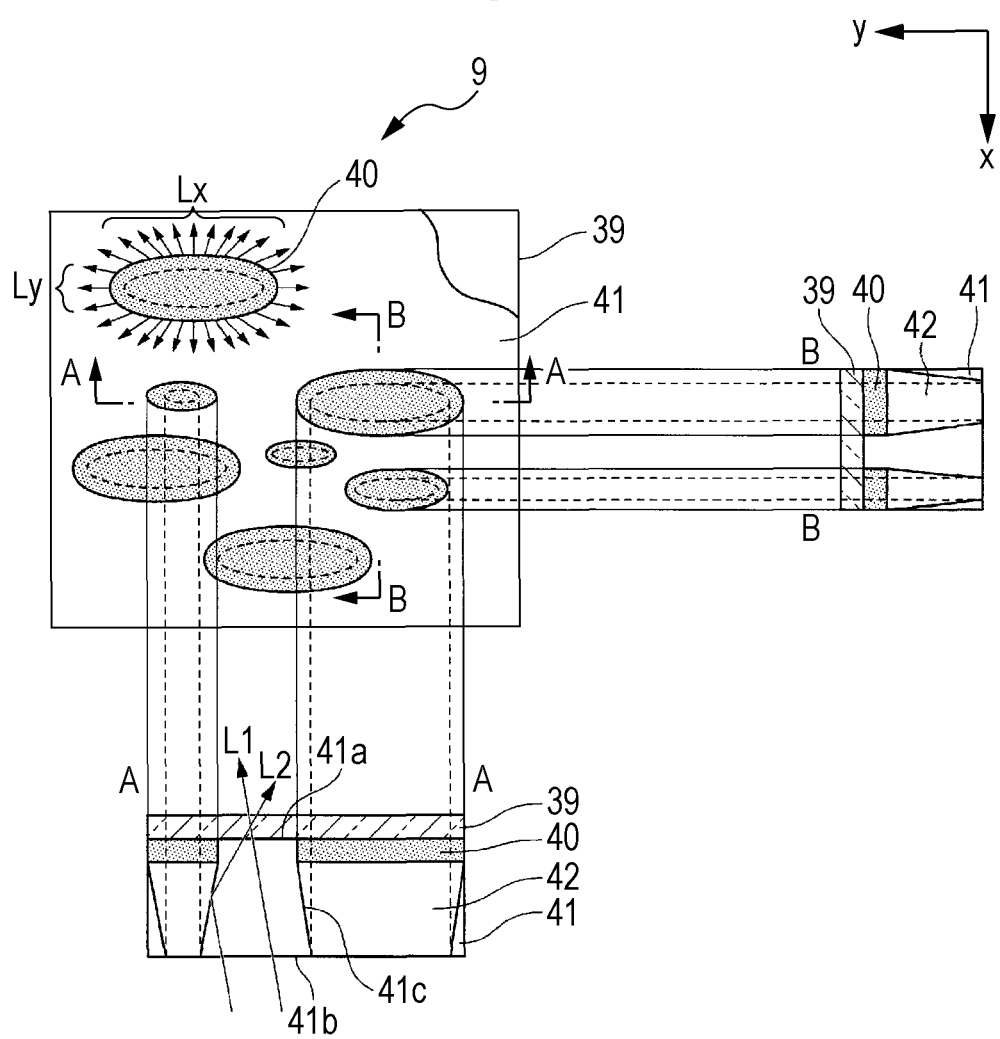
FIG. 4 is a schematic view of the light control member.

FIG. 3 is a perspective view when viewing the light control member 9 from a visual recognition side. FIG. 4 is a schematic view of the light control member 9. In FIG. 4, a left-upper section represents a plan view of the light control member 9. A left-lower section represents a cross-sectional view taken along line A-A in the plan view on the left-upper section. A right-upper section represents a cross-sectional view taken along line B-B in the plan view on the left-upper section.

As illustrated in FIG. 3, the light control member 9 includes a base material 39, a plurality of light-shielding layers 40, and a light-diffusing portion 41. The plurality of light-shielding layers 40 are formed on one surface (surface opposite to a visual recognition side) of the base material 39. The light-diffusing portion 41 is formed in a region on one surface of the base material 39 other than a region in which the light-shielding layers 40 are formed.

As illustrated in FIG. 1, the light control member 9 is disposed on the second polarizing plate 7 in a state in which the light-diffusing portion 41 faces the second polarizing plate 7 and the base material 39 faces the visual recognition side. The light control member 9 is fixed to the second polarizing plate 7 through an adhesive layer 43.

For example, as the base material 39, a base material, which is formed from a transparent resin such as a triacetyl cellulose (TAC) film, a polyethylene terephthalate (PET) film, a polycarbonate (PC) film, a polyethylene naphthalate (PEN) film, and a polyether sulfone (PES) film, is preferably used. The base material 39 becomes a base during the subsequent application of a material of the light-shielding layers 40 or the light-diffusing portion 41 in a manufacturing process. It is desirable for the base material 39 to have sufficient heat resistance and mechanical strength during a heat treatment process in the manufacturing process. Accordingly, in addition to the resin base material, a glass base material, and the like may be used as the base material 39. However, it is preferable that the thickness of the base material 39 is small to a certain extent in which the heat resistance or the mechanical strength thereof is not damaged. The reason for the preference is as follows. As the thickness of the base material 39 increases, there is a concern that blurring of display may occur. In addition, it is preferable that the total light transmittance of the base material 39 is 90% or higher in accordance with regulation of JIS K7361-1. When the total light transmittance is 90% or greater, it is possible to obtain sufficient transparency.

In this embodiment, a transparent resin base material having a thickness of 100 μm is used as an example.

The light-shielding layers 40 are randomly disposed when viewed from a normal direction of a main surface of the base material 39. As an example, the light-shielding layers 40 are constituted by an organic material such as a black resist and a black ink which have light absorbing properties and photosensitivity. In addition to the material, a metal film such as chromium (Cr) and a multi-layer film of Cr/Cr oxide may be used.

For example, the light-diffusing portion 41 is constituted by an organic material such as an acrylic resin and an epoxy resin which have optical transparency and photosensitivity. In addition, it is preferable that the total light transmission of the light-diffusing portion 41 is 90% or greater in accordance with regulation JIS K7361-1. When the total light transmittance is 90% or greater, it is possible to obtain sufficient transparency.

As illustrated in FIG. 4, the light-diffusing portion 41 has a light-emitting end surface 41a, a light-incident end surface 41b, and a reflective surface 41c. The light-emitting end surface 41a is a surface that comes into contact with the base material 39. The light-incident end surface 41b is a surface that is opposite to the light-emitting end surface 41a. The reflective surface 41c is a tapered side surface of the light-diffusing portion 41. The reflective surface 41c is a surface that reflects light that is incident from the light-incident end surface 41b. An area of the light-incident end surface 41b is larger than an area of the light-emitting end surface 41a.

The light-diffusing portion 41 is a portion that contributes to light transmission in the light control member 9. Among light beams, which are incident to the light-diffusing portion 41, a light beam L1 is not reflected from the reflective surface 41c and is emitted from the light-emitting end surface 41a. Among light beams, which are incident to the light-diffusing portion 41, a light beam L2 is guided in a state of being approximately closed at the inside of the light-diffusing portion 41 while being totally reflected from the reflective surface 41c of the light-diffusing portion 41, and is emitted from the light-emitting end surface 41a.

In the light control member 9, the base material 39 is appropriately disposed on the visual recognition side. According to this, in the two opposite surfaces of the light-diffusing portion 41, the surface having a smaller area becomes the light-emitting end surface 41a. On the other hand, the surface having a larger area becomes the light-incident end surface 41b.

An inclination angle (an angle made by the light-incident end surface 41b and the reflective surface 41c) of the reflective surface 41c of the light-diffusing portion 41 is approximately 80°±5° as an example. However, the inclination angle of the reflective surface 41c of the light-diffusing portion 41 is not particularly limited as long as the inclination angle is set to an angle with which incident light is capable of being sufficiently diffused during emission from the light control member 9. In this embodiment, the inclination angle of the reflective surface 41c of the light-diffusing portion 41 is set to be constant.

A height of the light-diffusing portion 41 from the light-incident end surface 41b to the light-emitting end surface 41a is set to be larger than the layer thickness of the light-shielding layers 40. In this embodiment, the layer thickness of the light-shielding layer 40 is approximately 150 nm as an example. A height of the light-diffusing portion 41 from the light-incident end surface 41b to the light-emitting end surface 41a is approximately 20 μm as an example. A portion, which is surrounded by the reflective surface 41c of the light-diffusing portion 41 and each of the light-shielding layers 40 is set as a hollow portion 42. Air exists in the hollow portion 42.

In addition, it is desirable for a refractive index of the base material 39 and a refractive index of the light-diffusing portion 41 to be substantially the same as each other. The reason for this is as follows. For example, consideration will be given to a case where the refractive index of the base material 39 and the refractive index of the light-diffusing portion 41 are very different from each other. In this case, when light incident from the light-incident end surface 41b is emitted from the light-diffusing portion 41, unnecessary light refraction or reflection may occur on an interface between the light-diffusing portion 41 and the base material 39. In this case, the following problems and the like occur. Specifically, a desired viewing angle is not obtained, and the amount of emission light decreases.

In the case of this embodiment, air exists in the hollow portion 42 (the outside of the light-diffusing portion 41). According to this, for example, when assuming that the light-diffusing portion 41 is formed from a transparent acrylic resin, the reflective surface 41c of the light-diffusing portion 41 becomes an interface between the transparent acrylic resin and air. Here, the hollow portion 42 may be filled with a different material having a low refractive index. However, a difference in a refractive index at the interface between the inside and the outside of the light-diffusing portion 41 becomes the maximum in a case where air exists at the outside in comparison to a case where an arbitrary material having a low refractive index exists at the outside.

Accordingly, in accordance with Snell's law, a threshold angle in the configuration of this embodiment becomes the minimum, and an incidence angle range in which light is totally reflected from the reflective surface 41c of the light-diffusing portion 41 becomes broadest. As a result, light loss is further suppressed, and thus high luminance can be obtained.

As illustrated in the left-upper section of FIG. 4, in the light control member 9 of this embodiment, the plurality of light-shielding layers 40 are provided on one surface of the base material 39 in a scattered manner. A planar shape of each of the light-shielding layers 40 when viewed from a normal direction of the base material 39 is an elongated elliptical shape. The light-shielding layer 40 has an anisotropic shape having a major axis and a minor axis. A ratio of a dimension of the major axis to a dimension of the minor axis in the elliptical shape is, for example, 1.1 to 2.5.

The dimension of the major axis of the light-shielding layer 40 is, for example, 20 μm, and the dimension of the minor axis of the light-shielding layer 40 is, for example, 10 μm. In the light control member 9 of this embodiment, a ratio of the length of the minor axis to the length of the major axis is approximately the same in each of the light-shielding layers 40.

A ratio of an occupation area of the light-shielding layers 40 to a total area of the base material 39 is, for example, 30%±10%.

As illustrated in the left-lower section and the right-upper section of FIG. 4, a portion, which corresponds to a lower side of the light-shielding layer 40, becomes a hollow portion 42 having a truncated elliptical cone shape. The light control member 9 has a plurality of the hollow portions 42. The light-diffusing portion 41 is continuously provided in a portion other than the plurality of hollow portions 42.

In the light control member 9 of this embodiment, a major axis direction (hereinafter, may be referred to as a major axis direction of a light-shielding layer) of an ellipse, which constitutes a planar shape of each of the light-shielding layers 40, is provided in approximately the Y-direction. A minor axis direction (hereinafter, may be referred to as a minor axis direction of a light-shielding layer) of the ellipse, which constitutes the planar shape of each of the light-shielding layers 40, is provided in approximately the X-direction. According to this, when considering a direction of the reflective surface 41c of the light-diffusing portion 41, in the reflective surface 41c of the light-diffusing portion 41, a ratio of the reflective surface 41c along the Y-direction is larger than a ratio of the reflective surface 41c along the X-direction. According to this, the amount of light Lx that is reflected from the reflective surface 41c along the Y-direction and is diffused to the X-direction is greater than the amount of light Ly that is reflected from the reflective surface 41c along the X-direction and is diffused to the Y-direction. Accordingly, an azimuth angle direction in which diffusibility of the light control member 9 is relatively strong becomes the X-direction that is the minor axis direction of the light-shielding layer 40.

In addition, the planar shape of the light-shielding layer 40 may include shapes such as a circular shape, a polygonal shape, and a semi-circular shape.

In addition, parts of the light-shielding layers 40 may be formed to overlap each other.

Figure 5A:
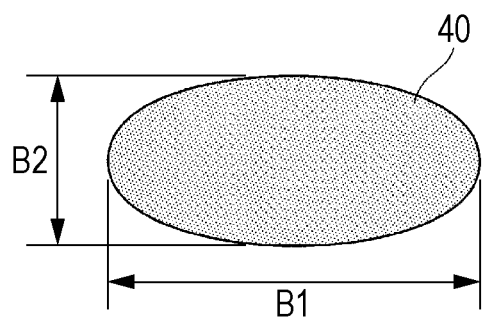
FIG. 5A is a plan view illustrating a light-shielding layer 40.
Figure 5B:
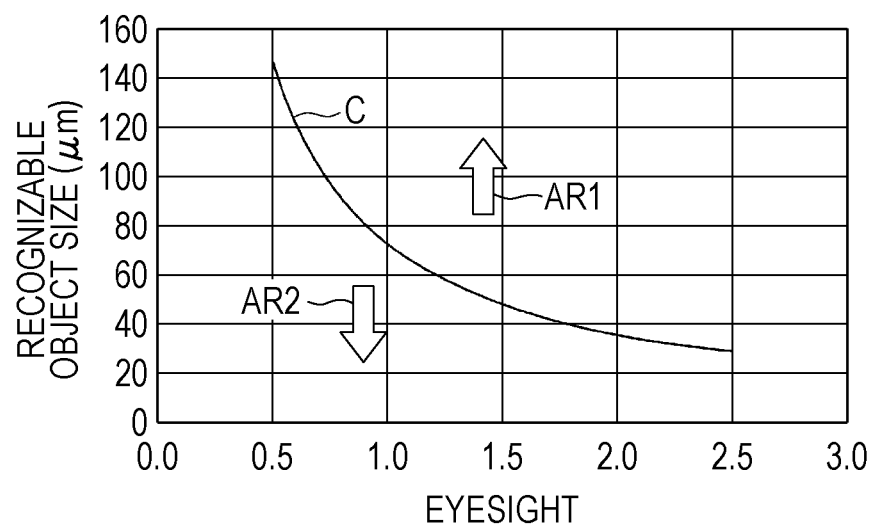
FIG. 5B is a graph illustrating a relationship between eyesight of human beings and an object size capable of being recognized with eyes of human beings.

FIGS. 5A and 5B are views illustrating the size of the light-shielding layers 40 in a plan view.

FIG. 5A is a plan view illustrating one of the plurality of light-shielding layers 40. FIG. 5B is a graph illustrating a relationship between eyesight of human beings and an object size capable of being recognized with eyes of human beings. In FIG. 5B, the horizontal axis represents eyesight of human beings. The vertical axis represents an object size capable of being recognized with the eyes of human beings.

In the light control member 9, it is preferable that the size of the light-shielding layers 40 in a plan view is made to be small to a certain extent. The reason for this as follows. When the size of the light-shielding layers 40 in a plan view is too large, there is a concern that in a display image of the liquid crystal display device 1, the light-shielding layers 40 may be recognized as dots.

As illustrated in FIG. 5A, the length of the light-shielding layers 40 in the major axis direction is set as B1. The length of the light-shielding layers 40 in the minor axis direction is set as B2. It is preferable that the length B1 of the light-shielding layers 40 in the major axis direction is 100 μm or less in order for the light-shielding layers 40 not to be recognized as dots. Hereinafter, a method of deriving the length B1 of the light-shielding layer 40 in the major axis direction will be described.

As illustrated in FIG. 5B, there is a constant relationship between the eyesight of human beings and the object size capable of being recognized with the eyes of human beings. A range AR1 on an upper side of a curve C illustrated in FIG. 5B is a range in which an object is capable of being recognized with the eyes of human beings. On the other hand, a range AR2 on a lower side of the curve C is a range in which an object is not capable of being recognized with the eyes of human beings. The curve C is defined by the following Equation (3) which is derived from the following equation.

In the eyes of human beings, when a minimum visual angle is set as β (minute), eyesight α is derived from the following Equation (1).

$$\alpha = 1/\beta \quad (1)$$

When the object size capable of being recognized with eyes of human beings is set as V (mm), and a distance from the eyes of human beings to an object is set as W (m), the minimum visual angle β is derived from the following Equation (2).

$$\beta = (V/1000)/\{W \times 2\pi/(360/60)\} \quad (2)$$

The eyesight α is expressed by the following Equation (3) in accordance with Equation (1) and Equation (2).

$$\alpha = \{W \times 2\pi/(360/60)\}/(V/1000) \quad (3)$$

When modifying Equation (3), the object size V capable of being recognized with the eyes of human beings is expressed by the following Equation (4).

$$V = [\{W \times 2\pi/(360/60)\} \times 1000]/\alpha \quad (4)$$

When using a portable electronic apparatus such as a portable telephone, the distance W from the eyes of human beings to an object is approximately 20 cm to 30 cm. Here, as an example, the distance W from the eyes of human beings to the object is set as 25 cm.

A minimum eyesight level for acquisition of a driver's license is 0.7. In this case, the object size V capable of being recognized with the eyes of human beings is 100 µm. When the object size V is 100 µm or less, it is considered that it is difficult for the eyes of human beings to recognize the object. That is, it is preferable that the length B1 of the light-shielding layer 40 in the major axis direction is 100 µm or less. According to this, the light-shielding layers 40 are suppressed from being recognized as dots on a display image. In this case, the length B2 of the light-shielding layers 40 in the minor axis direction is shorter than the length B1 of the light-shielding layer 40 in the major axis direction, and is set to 100 µm or less.

The object size V, which is capable of being recognized with the eyes of human beings having an eyesight level of 2.0, is 40 µm. When the object size V is 40 µm or less, it is considered that it is difficult for the object to be recognized with the eyes of human beings in many cases. That is, it is more preferable that the length B1 of the light-shielding layers 40 in the major axis direction is 40 µm or less. According to this, the light-shielding layers 40 are reliably suppressed from being recognized as dots on a display screen of the liquid crystal display device 1. In this case, the length B2 of the light-shielding layers 40 in the minor axis direction is shorter than the length B1 of the light-shielding layers 40 in the major axis direction, and is set to 40 µm or less.

Hereinafter, description will be made with respect to a case where the light control member 9 and a VA-mode liquid crystal are combined with each other.

Figure 6:
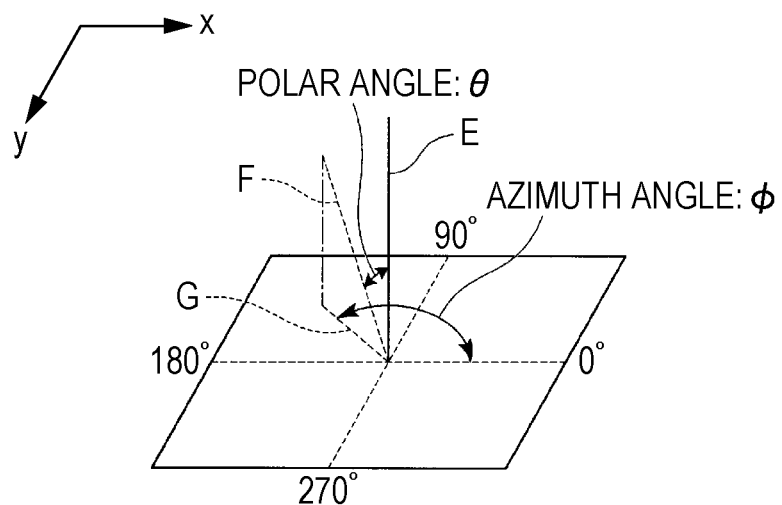
FIG. 6 is a view illustrating definition of a polar angle and an azimuth angle.

FIG. 6 is a view illustrating definition of a polar angle and an azimuth angle.

Here, as illustrated in FIG. 6, when a normal direction E of a screen of the liquid crystal display device 1 is set as a reference, an angle made by a visual line direction F of an observer is set as a polar angle θ. When a positive direction (0° direction) of the x-axis is set as a reference, an angle made by a direction of a line segment G during projection of the visual line direction F of the observer onto a screen is set as an azimuth angle ϕ.

Figure 7:
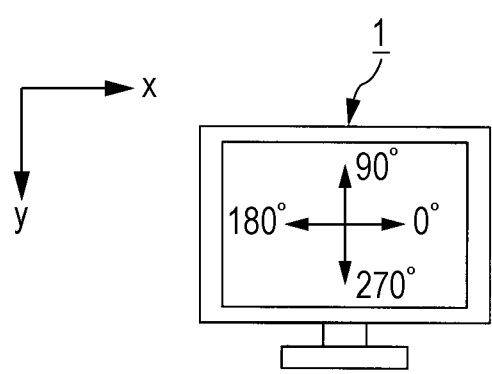
FIG. 7 is a front elevation view of a liquid crystal display device 1.

FIG. 7 is a front elevation view of the liquid crystal display device 1.

As illustrated in FIG. 7, in the screen of the liquid crystal display device 1, the horizontal direction (x-axis direction) is set as a direction in which the azimuth angle ϕ is 0° or 180°. The vertical direction (y-axis direction) is set as a direction in which the azimuth angle ϕ is 90° or 270°. In addition, in this embodiment, a transmission axis of the first polarizing plate 3 is a direction in which the azimuth angle ϕ is 90° or 270°, and a transmission axis of the second polarizing plate 7 is a direction in which the azimuth angle ϕ is 0° or 180°.

Figure 8:
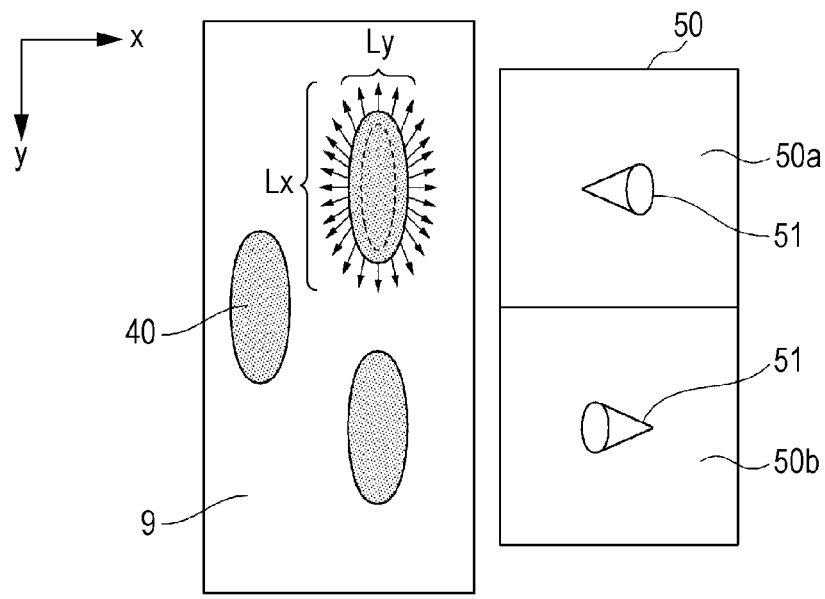
FIG. 8 is a schematic view illustrating an arrangement relationship between a pixel including a VA mode liquid crystal and a light control member.

FIG. 8 is a schematic view illustrating an alignment relationship between a pixel 50 including a VA-mode liquid crystal and the light control member 9 which are included in the liquid crystal display device 1. Actually, as illustrated in FIG. 1, the light control member 9 is disposed on the pixel 50. However, for convenience of explanation, the pixel 50 and the light control member 9 are illustrated in a parallel manner in FIG. 8.

With regard to the pixel 50 in this embodiment, two-domain VA, in which one pixel 50 is divided into a first domain 50a and a second domain 50b, is employed. Liquid crystal molecules 51 included in the pixel 50 are aligned in an approximately vertical manner in a state in which a voltage is not applied thereto. In FIG. 8, each of the liquid crystal molecules 51 is illustrated in a conical shape. The vertex of the cone represents an end on a rear surface side of the liquid crystal molecule 51. The bottom of the cone represents an end on a visual recognition side of the liquid crystal molecule. In this embodiment, a director of the liquid crystal molecule 51 is defined as a direction from an end on a rear surface side of the liquid crystal molecule to an end on a visual recognition side of the liquid crystal molecule.

As illustrated in FIG. 8, the liquid crystal molecule 51 that is included in the first domain 50a, and the liquid crystal molecule 51 that is included in the second domain 50b are aligned to be inclined in directions which are different from each other by 180° in a direction in which the azimuth angle ϕ of 0° or 180°. Specifically, the director of the liquid crystal molecule 51 that is included in the first domain 50a is inclined in such a manner that the polar angle θ at the azimuth angle ϕ of 0° becomes larger than 0°. The director of the liquid crystal molecule 51 that is included in the second domain 50b is inclined in such a manner that the polar angle θ at the azimuth angle ϕ of 180° becomes larger than 0°. When aligning the liquid crystal molecule 51 as described above at the central portion of the liquid crystal layer 11 in a thickness direction during application of a voltage in the first domain 50a, the liquid crystal molecule 51 falls down in such a manner that the azimuth angle ϕ becomes 0° and the polar angle becomes close to 90°.

In the second domain 50b, at the central portion of the liquid crystal layer 11 in a thickness direction during application of a voltage, the liquid crystal molecule 51 falls down in such a manner that the azimuth angle ϕ becomes 180° and the polar angle becomes close to 90°. That is, at the central portion of the liquid crystal layer 11 in a thickness direction during application of a voltage, the liquid crystal molecule 51 that is included in the first domain 50a and the liquid crystal molecule 51 that is included in the second domain 50b fall down in directions different from each other by 180° in a direction in which the azimuth angle ϕ is 0° or 180°. In addition, with regard to a liquid crystal molecule 51 in the vicinity of the first alignment film 27 and the second alignment film 34, alignment is restricted in the first alignment film 27 and the second alignment film 34, and thus the liquid crystal molecule 51 is maintained in an approximately vertical manner even during application of a voltage.

Figure 10:
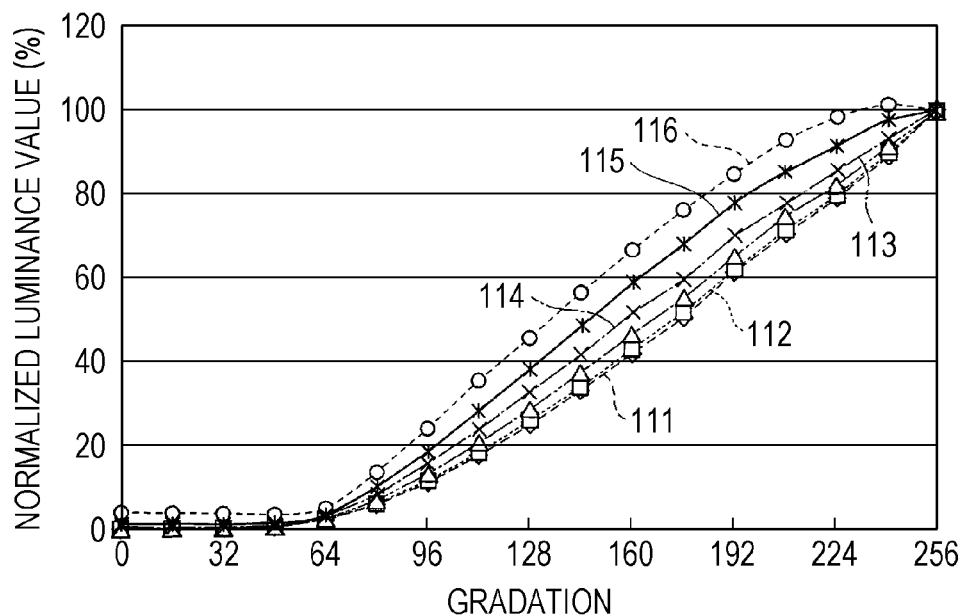
FIG. 10 is a view illustrating gamma characteristics in a case of changing the polar angle θ at the azimuth angle φ of 270° in the liquid crystal display device that does not include the light control member.

FIG. 10 illustrates gamma characteristics in a case of changing the polar angle θ at the azimuth angle ϕ of 270° in the liquid crystal display device that does not include the light control member 9. In FIG. 10, the horizontal axis represents a gray scale, and the vertical axis represents a normalized luminance. The normalized luminance represents a normalized luminance when a luminance at a 256 gray scale is set to 100%. In FIG. 10, a reference numeral 111 represents gamma characteristics at the polar angle θ of 0°.

A reference numeral 112 represents gamma characteristics at the polar angle θ of 15°. A reference numeral 113 represents gamma characteristics at the polar angle θ of 30°. A reference numeral 114 represents gamma characteristics at the polar angle θ of 45°. A reference numeral 115 represents gamma characteristics at the polar angle θ of 60°. A reference numeral 116 represents gamma characteristics at the polar angle θ of 75°. As illustrated in FIG. 10, when observing the liquid crystal display device 1 including the pixel 50 while changing the polar angle θ in a direction in which the azimuth angle ϕ is 90° or 270°, a variation in the gamma characteristics is relatively small.

Figure 9:
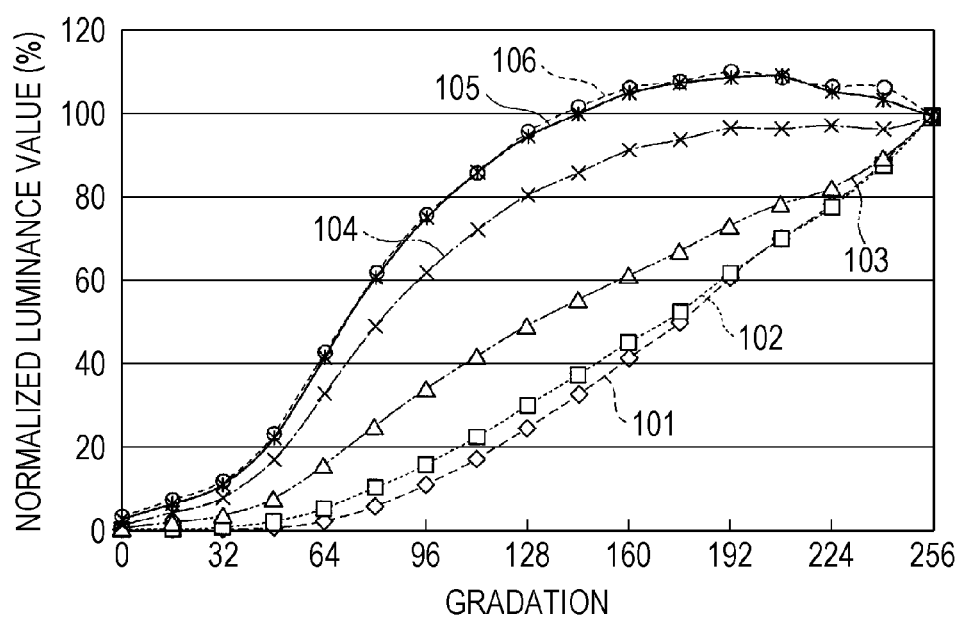
FIG. 9 is a view illustrating gamma characteristics in a case of changing a polar angle θ at an azimuth angle φ of 180° in a liquid crystal display device that does not include the light control member.

FIG. 9 illustrates gamma characteristics in a case of changing the polar angle θ at an azimuth angle ϕ of 180° in the liquid crystal display device that does not include the light control member 9. In FIG. 9, the horizontal axis represents a gray scale, and the vertical axis represents a normalized luminance. In FIG. 9, a reference numeral 101 represents gamma characteristics at the polar angle θ of 0°. A reference numeral 102 represents gamma characteristics at the polar angle θ of 15°. A reference numeral 103 represents gamma characteristics at the polar angle θ of 30°. A reference numeral 104 represents gamma characteristics at the polar angle θ of 45°. A reference numeral 105 represents gamma characteristics at the polar angle θ of 60°. A reference numeral 106 represents gamma characteristics at the polar angle θ of 75°. As illustrated in FIG. 9, when performing observation while changing the polar angle θ in a direction in which the azimuth angle ϕ is 0° or 180°, variation in the gamma characteristics is great. When being compared with FIG. 10, it can be seen that the gamma characteristics greatly vary while being dependent on the polar angle θ. In addition, at the polar angle θ of 60° and the polar angle θ of 75°, gray scale reversal occurs at a 145 or higher gray scale.

As described above, the difference in viewing angle characteristics in a direction in which the azimuth angle ϕ is 0° or 180° and viewing angle characteristics in a direction in which the azimuth angle ϕ is 90° or 270° is caused by the fact that the liquid crystal molecules are aligned to fall down only in a direction in which the azimuth angle ϕ is 0° or 180°.

When changing the polar angle θ at a visual point of an observer in a direction in which the azimuth angle ϕ is 90° or 270°, the visual point moves toward the minor axis direction of the liquid crystal molecule 51, and thus a variation in an external shape of the liquid crystal molecule 51 is not great. On the other hand, when changing the polar angle θ of the visual point in a direction in which the azimuth angle ϕ is 0° or 180°, the visual point moves toward the major axis direction of the liquid crystal molecule 51, and the visual point moves along a direction in which the liquid crystal molecule 51 falls down, and thus the variation in the external shape of the liquid crystal molecule 51 is great.

In this embodiment, as illustrated in FIG. 8, the light control member 9 is disposed in such a manner that the direction in which the liquid crystal molecule 51 falls down during application of a voltage, and the minor axis direction of the light-shielding layers 40 of the light control member 9 approximately match each other.

As described above, among light beams which are emitted from the light control member 9, the light beam Ly that is scattered in a direction in which the azimuth angle ϕ is 90° or 270° is less. Accordingly, the viewing angle characteristics in a direction in which the azimuth angle ϕ is 90° or 270° are almost not changed from those of the liquid crystal display device that does not include the light control member 9.

On the other hand, among light beams, which are emitted from the light control member 9, the amount of light beams Lx which are scattered in a direction in which the azimuth angle ϕ is 0° or 180° (that is, the minor axis direction of the light-shielding layers 40) are greater than the amount of light beams Ly which are scattered in a direction in which the azimuth angle ϕ is 90° or 270°. That is, light scattering characteristics in a direction in which the azimuth angle ϕ is 0° or 180° are relatively large.

Light beams, which are incident to the light control member 9 at different polar angles θ, are mixed-in by the light control member 9 in a direction in which the azimuth angle ϕ is 0° or 180°. As a result, a difference in luminance variation in a direction in which the azimuth angle ϕ is 0° or 180° is averaged, and thus the variation in gamma characteristics, which depend on the polar angle θ in a direction in which the azimuth angle ϕ is 0° or 180°, is mitigated.

Figure 11:
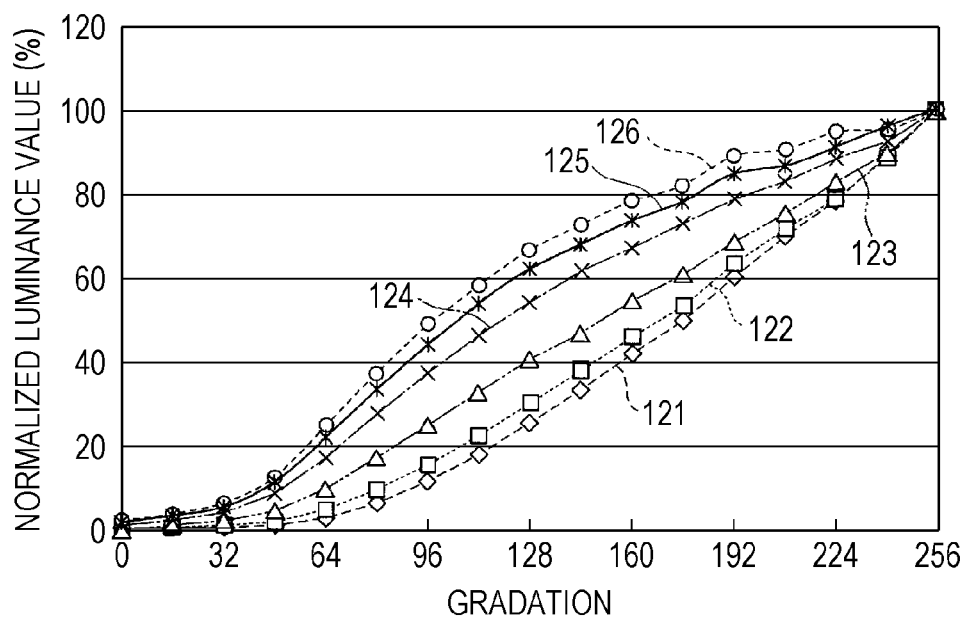
FIG. 11 is a view illustrating gamma characteristics in a case of changing the polar angle θ at the azimuth angle φ of 180° in the liquid crystal display device according to the first embodiment of the invention.

FIG. 11 illustrates gamma characteristics in a case of changing the polar angle θ at the azimuth angle ϕ of 180° in the liquid crystal display device 1 according to this embodiment. In FIG. 11, the horizontal axis represents a gray scale, and the vertical axis represents a normalized luminance. In FIG. 11, a reference numeral 121 represents gamma characteristics at the polar angle θ of 0°. A reference numeral 122 represents gamma characteristics at the polar angle θ of 15°. A reference numeral 123 represents gamma characteristics at the polar angle θ of 30°. A reference numeral 124 represents gamma characteristics at the polar angle θ of 45°. A reference numeral 125 represents gamma characteristics at the polar angle θ of 60°. A reference numeral 126 represents gamma characteristics at the polar angle θ of 75°. It can be seen that a variation in the gamma characteristics which depends on the polar angle θ is small in comparison to that in a liquid crystal display device that does not include the light control member 9 illustrated in FIG. 9. Particularly, it can be seen that the gamma characteristics at the polar angle θ of 45° or greater become close to the gamma characteristics at the polar angle θ of 0°. From this result, it can be seen that when viewing the liquid crystal display device 1 from an oblique direction at the azimuth angle ϕ of 180°, a color variation is mitigated. In addition, in the gamma characteristics at the polar angle θ of 60° and the polar angle θ of 75°, gray scale reversal, which occurs at a 145 gray scale or higher, is suppressed.

In addition, in FIG. 11, a variation in the gamma characteristics at the azimuth angle ϕ of 180° is illustrated, and a variation also occurs in the gamma characteristics at the azimuth angle ϕ of 0°. The reason for this is as follows. In this embodiment, as a pixel configuration, a two-domain VA type is used. In the respective domains 50a and 50b, the liquid crystal molecules 51 are obliquely aligned in directions different from each other by 180° in a direction in which the azimuth angle ϕ is 0° or 180°, and thus the gamma characteristics at the azimuth angle ϕ of 0° are equal to the gamma characteristics at the azimuth angle ϕ of 180°. Similarly, in FIG. 9, a variation in the gamma characteristics at the azimuth angle ϕ of 180° is illustrated, and a variation also occurs in the gamma characteristics at the azimuth angle ϕ of 0°. In addition, in FIG. 10, a variation in the gamma characteristics at the azimuth angle ϕ of 270° is illustrated, and a variation also occurs in the gamma characteristics at the azimuth angle ϕ of 90°.

As described above, when the light control member 9 of this embodiment is combined with the liquid crystal display device 1 that employs the two-domain VA type, the viewing angle characteristics in a direction, in which the azimuth angle ϕ is 0° or 180° as a direction in which the liquid crystal molecule 50 falls down, are improved. In a liquid crystal display device, which employs a two-domain VA type of the related art, the viewing angle characteristics in a direction, in which the azimuth angle ϕ is 90° or 270° and which is perpendicular to a direction in which the liquid crystal molecule 50 falls down, were satisfactory. However, when the liquid crystal display device is combined with the light control member 9 of this embodiment, the following effect is obtained. Specifically, the viewing angle characteristics in a direction in which the azimuth angle φ is 90° or 270° are retained in a satisfactory manner, and the viewing angle characteristics in a direction in which the azimuth angle φ is 0° or 180° are improved.

(Method of Manufacturing Liquid Crystal Display Device)

FIGS. 12A to 12D are perspective views sequentially illustrating a process of manufacturing the light control member 9.

Description will be made with respect to the manufacturing method with focus given to the process of manufacturing the light control member 9 that constitutes the liquid crystal display device 1 having the above-described configuration.

First, an outline of the process of manufacturing the liquid crystal panel 2 will be described. First, the TFT substrate 10 and the color filter substrate 12 are prepared respectively. Then, a surface of the TFT substrate 10 on which the TFT 19 is formed and a surface of the color filter substrate 12 on which the color filter 31 is formed are disposed to face each other. In addition, the TFT substrate 10 and the color filter substrate 12 are bonded to each other through a sealing member. Then, liquid crystal is injected into a space surrounded by the TFT substrate 10, the color filter substrate 12, and the sealing member. The first phase difference film 4 and the first polarizing plate 3, and the second phase difference film 6 and the second polarizing plate 7 are bonded to both surfaces of the liquid crystal cell 5 prepared as described above, respectively, through an optical adhesive and the like. Through the above-described processes, the liquid crystal panel 2 is completed.

A method of manufacturing the TFT substrate 10 or the color filter substrate 12 may be executed in accordance with a typical method, and thus description thereof will be omitted.

Figure 12A:
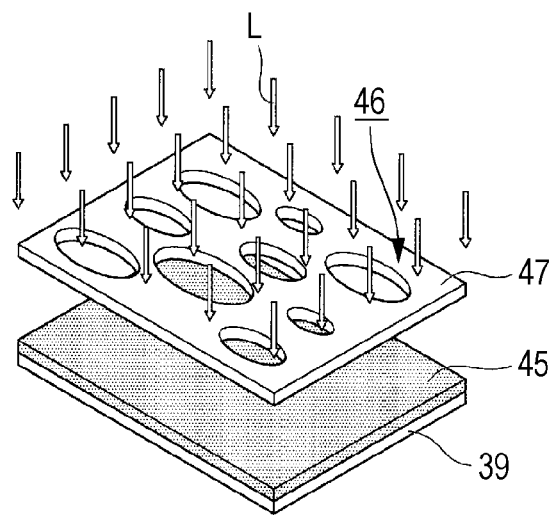
FIG. 12A is a perspective view illustrating a process of manufacturing the light control member according to the first embodiment of the invention.

A process of manufacturing the light control member 9 will be described. As illustrated in FIG. 12A, a triacetyl cellulose base material 39 having a thickness of 100 μm is prepared. Then, as a material of the light-shielding portion, a carbon-containing black negative resist is applied to one surface of the base material 39 by using a spin coating method. According to this, a coated film 45 having a film thickness of 150 nm is formed.

The base material 39 on which the coated film 45 is formed is placed on a hot plate, and pre-baking of the coated film 45 is performed at a temperature of 90° C. According to this, a solvent in the black negative resist is volatilized.

The coated film 45 is irradiated with light L through a photo-mask 47 in which a plurality of opening patterns 46 having, for example, an elliptical planar shape are formed by using an exposing apparatus so as to perform exposure. At this time, an exposing apparatus, which uses mixed rays of i-rays having a wavelength of 365 nm, h-rays having a wavelength of 404 nm, and g-rays having a wavelength of 436 nm, is used. An amount of exposure is set to 100 mJ/cm².

Figure 12B:
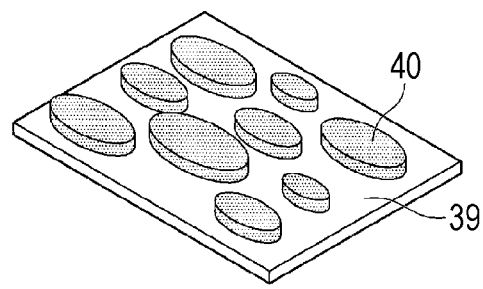
FIG. 12B is a perspective view illustrating a process of manufacturing the light control member according to the first embodiment of the invention.

After performing the exposure by using the photo-mask 47, the coated film 45 formed from the black negative resist is developed by using a dedicated developing solution, and drying is performed at 100° C., thereby forming the plurality of light-shielding layers 40 having, for example, an elliptical planar shape on the one surface of the base material 39 as illustrated in FIG. 12B. In the case of this embodiment, in the subsequent process, exposure with respect to a transparent negative resist is performed by using the light-shielding layers 40 formed from the black negative resist as a mask, thereby forming the hollow portions 42. According to this, a position of each of the opening patterns 46 in the photo-mask 47 corresponds to a position at which each of the hollow portions 42 is formed.

Each of the elliptical light-shielding layers 40 corresponds to a region (hollow portion 42) in which the light-diffusing portion 41 is not formed in the subsequent process.

All of the plurality of opening patterns 46 are elliptical patterns. The major axis and the minor axis of each of the opening patterns 46 are configured with various sizes. Arrangement of a gap (pitch) between the opening patterns 46 which are adjacent to each other may not be regular or may not be periodic. It is preferable that the gap (pitch) between the opening patterns 46 is smaller than a gap (pitch, for example, 150 μm) between pixels of the liquid crystal panel 2. According to this, at least one light-shielding layer 40 is formed in a pixel. Accordingly, for example, it is possible to realize a wide viewing angle during combination with a liquid crystal panel having a small pixel pitch which is used, for example, in a mobile apparatuses and the like.

In this embodiment, the light-shielding layers 40 are formed in accordance with a photolithography method using the black negative resist, but there is no limitation thereto. In addition to this, when using a photo-mask in which the opening patterns 46 of this embodiment and light-shielding patterns are inverted from each other, a light-absorbing positive resist can be used. Alternatively, the light-shielding layers 40 can be directly formed by using a deposition method, a printing method, and the like.

Figure 12C:
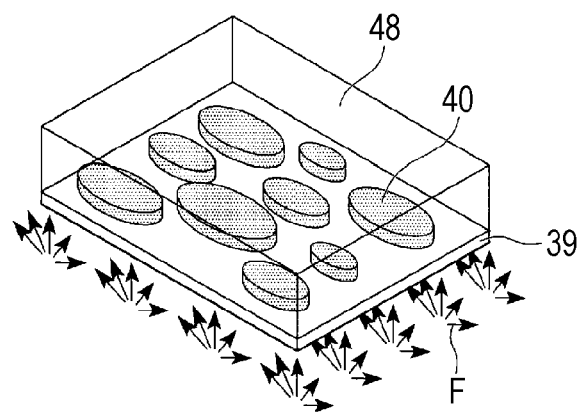
FIG. 12C is a perspective view illustrating a process of manufacturing the light control member according to the first embodiment of the invention.

Next, as illustrated in FIG. 12C, as a material of the light-diffusing portion, a transparent negative resist formed from an acrylic resin is applied onto the upper surface of the light-shielding layers 40 by using a spin coating method. According to this, the coated film 48 having a film thickness of 20 μm is formed.

Next, the base material 39 on which the above-described coated film 48 is formed is placed on a hot plate, and pre-baking of the coated film 48 is performed at a temperature of 95° C. According to this, a solvent in the transparent negative resist is volatilized.

Then, the coated film 48 is irradiated with light F from the base material 39 side by using the light-shielding layers 40 as a mask so as to perform exposure. At this time, an exposing apparatus, which uses mixed rays of i-rays having a wavelength of 365 nm, h-rays having a wavelength of 404 nm, and g-rays having a wavelength of 436 nm, is used. An amount of exposure is set to 500 mJ/cm².

Then, the base material 39 on which the above-described coated film 48 is formed is placed on a hot plate, and post-exposure baking (PEB) of the coated film 48 is performed at a temperature of 95° C.

Figure 12D:
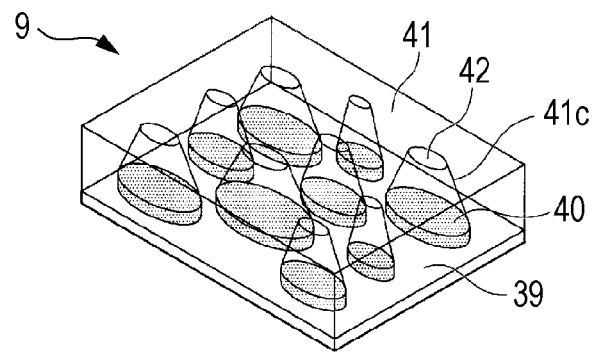
FIG. 12D is a perspective view illustrating a process of manufacturing the light control member according to the first embodiment of the invention.

Then, the coated film 48 formed from the transparent negative resist is developed by using a dedicated developing solution, and post-baking is performed at 100° C., thereby forming the transparent resin layer 41 having the plurality of hollow portions 42 on the one surface of the base material 39 as illustrated in FIG. 12D. In this embodiment, as illustrated in FIG. 12C, exposure is performed by using diffused light, and thus the transparent negative resist that constitutes the coated film 48 is radially exposed to be spread from a region in which the light-shielding layers 40 are not formed toward an outer side. According to this, the hollow portions 42 having a forward tapered shape are formed. The light-diffusing portion 41 has a reversed tapered shape. An inclination angle of the reflective surface 41c of the light-diffusing portion 41 can be controlled to a certain extent in which the diffused light is diffused.

As the light F that is used herein, parallel light, diffused light, or light in which intensity at a specific emission angle is different from intensity at another emission angle, that is, light having strength and weakness at a specific emission angle can be used. In the case of using the parallel light, the inclination angle of the reflective surface 41c of the light-diffusing portion 41 becomes, for example, a single inclination angle of approximately 60° to 90°. In the case of using the diffused light, an inclined surface, in which the inclination angle continuously varies and a cross-sectional shape is a curve shape, is obtained. In the case of using the light having strength and weakness at a specific emission angle, an inclined surface having an inclined surface angle, which corresponds to the strength and weakness, is obtained. As described above, the inclination angle of the reflective surface 41c of the light-diffusing portion 41 can be adjusted. According to this, it is possible to adjust the light diffusibility of the light control member 9 in order for a target visibility to be obtained.

In addition, as one unit that irradiates the base material 39 with parallel light emitted from the exposing apparatus as the light F, for example, a diffusing plate having a haze of approximately 50 is disposed on an optical path of light emitted from the exposing apparatus, and irradiation with light is performed through the diffusing plate.

Through the above-described processes in FIGS. 12A to 12D, the light control member 9 of this embodiment is completed. It is preferable that a total light transmittance of the light control member 9 is 90% or greater. When the total light transmittance is 90% or greater, it is possible to obtain sufficient transparency, and thus it is possible to sufficiently exhibit optical performance which is desirable for the light control member 9. The total light transmittance is regulated in accordance with JIS K7361-1. In addition, in this embodiment, a case of using a liquid resist is exemplified as an example. However, instead of this configuration, a film-shaped resist may be used.

Finally, as illustrated in FIG. 2, the light control member 9 that is completed is bonded to the liquid crystal panel 2 through the adhesive layer 43 in a state in which the base material 39 faces the visual recognition side, and the light-diffusing portion 41 faces the second polarizing plate 7.

Through the above-described processes, the liquid crystal display device 1 of this embodiment is completed.

In the liquid crystal display device 1 according to this embodiment, the light control member 9 is disposed on a light emission side of the liquid crystal panel 2, and thus light that is incident to the light control member 9 is emitted from the light control member 9 in a state in which an angle distribution is broadened from an angle distribution prior to incidence to the light control member 9. Accordingly, even when a visual line of an observer is inclined from a front elevation direction (normal direction) of the liquid crystal display device 1, the observer can visually recognize satisfactory display.

In addition, an azimuth angle direction (direction in which the azimuth angle ϕ is 0° or 180°) and in which when applying a constant voltage to the liquid crystal panel 2 of the light control member 9, a variation in a transmittance in a polar angle direction is relatively large, and the azimuth angle direction in which the diffusibility of the light control member 9 is relatively strong approximately match each other. Accordingly, light-scattering characteristics from the liquid crystal display device 1 in the direction in which the azimuth angle ϕ is 0° or 180° increase in comparison to other azimuth angle directions. According to this, it is possible to average a degree of variation in luminance in a direction in which the azimuth angle ϕ is 0° or 180°. According to this, even when a visual line of an observer is inclined from a front elevation direction (normal direction) of the liquid crystal display device 1 in a direction in which the azimuth angle ϕ is 0° or 180°, a color variation is suppressed.

As described above, a variation in the gamma characteristics when obliquely viewing the display screen in a direction in which the azimuth angle ϕ is 0° or 180° is suppressed, and thus it is possible to provide the liquid crystal display device 1 that is excellent in the viewing angle characteristics.

In general, in a case where regular patterns such as a strip and a lattice are overlapped each other, when periods of respective patterns slightly deviate from each other, it is known that an interference fringe pattern (moire) is visually recognized. For example, when assuming that a light control member in which a plurality of light-diffusing portions are arranged in a matrix shape, and a liquid crystal panel in which a plurality of pixels are arranged in a matrix shape are overlapped each other, there is a concern that the moire occurs between a periodic pattern by the light-diffusing portions of the light control member and a periodic pattern by the pixels of the liquid crystal panel, and thus the moire may deteriorate the display quality.

In contrast, in the liquid crystal display device 1 according to this embodiment, the plurality of light-shielding layers 40 are randomly arranged in a plan view. The light-diffusing portion 41 is formed in a region other than a region in which the light-shielding layers 40 are formed. According to this, moire due to interference with the regular arrangement of the pixels of the liquid crystal panel 2 does not occur, and thus it is possible to maintain a display quality.

In this embodiment, the plurality of light-shielding layers 40 are randomly arranged, but it is not desirable for the arrangement of the plurality of light-shielding layers 40 to be random. When the arrangement of the plurality of light-shielding layers 40 is non-periodic, it is possible to suppress occurrence of the moire. In addition, in a case where the occurrence of some moire is permitted in accordance with a situation or a usage, the plurality of light-shielding layers 40 may be periodically arranged.

[Second Embodiment]

Hereinafter, a second embodiment of the invention will be described with reference to FIG. 13.

The basic configuration of a liquid crystal display device of this embodiment is the same as in the first embodiment except that a plurality of light-diffusing portions 341 are arranged in a light control member 309. According to this, in this embodiment, the light-control member 309 will be described.

Figure 13:
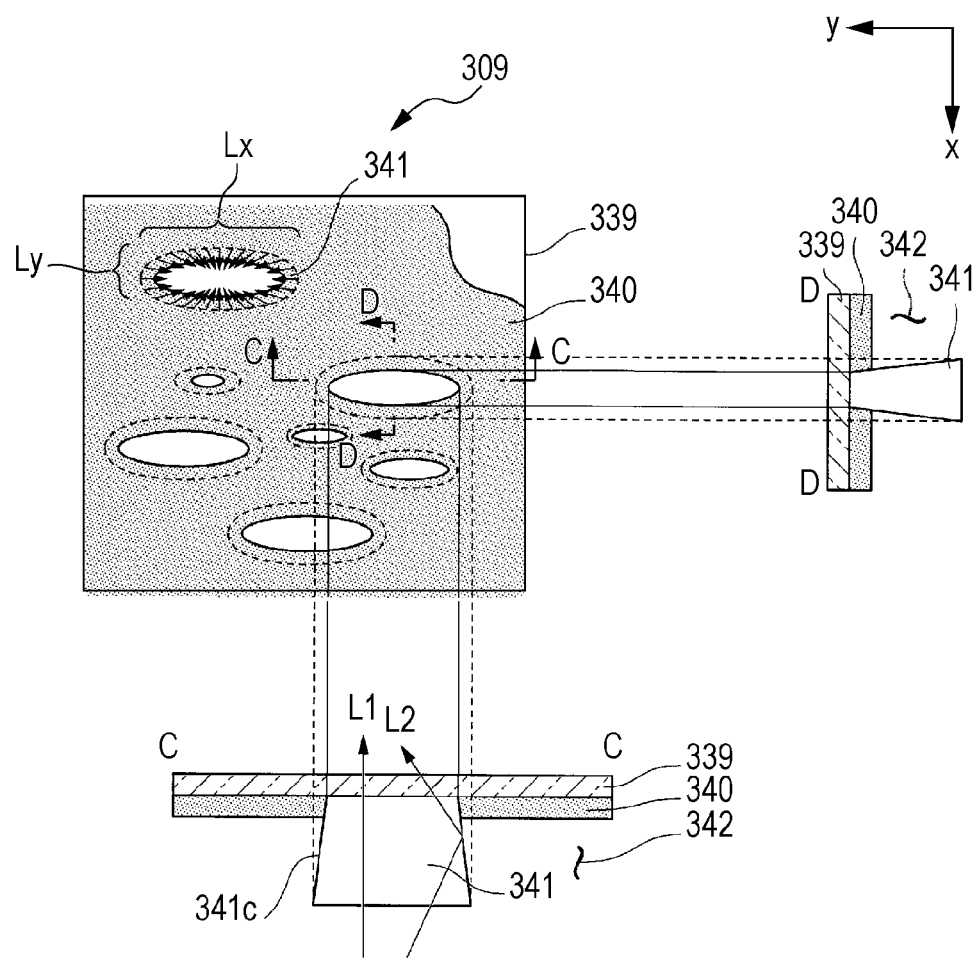
FIG. 13 is a schematic view of a light control member according to a second embodiment of the invention.

FIG. 13 is a schematic view of the light control member 309. In FIG. 13, a left-upper section represents a plan view of the light control member 309. A left-lower section represents a cross-sectional view taken along line C-C in the plan view on the left-upper section. A right-upper section represents a cross-sectional view taken along line D-D in the plan view on the left-upper section.

As illustrated on the left-upper section of FIG. 13, in the light control member 309 of this embodiment, the plurality of light-diffusing portions 341 are provided on one surface of a base material 339 in a scattered manner. A planar shape of each of the light-diffusing portions 341 when viewed from a normal direction of the base material 339 is elongated elliptical shape. The light-diffusing portion 341 has a major axis and a minor axis.

As illustrated on the left-lower section and the right-upper section of FIG. 13, a portion, which corresponds to a lower side of a light-shielding layer 340, becomes a hollow portion 342. Air exists in the hollow portion 342. The light control member 309 includes the hollow portion 342 which is continuous and in which air exists. The light-diffusing portions 341 are provided at a portion other than the hollow portion 342 in a scattered manner.

The major axis direction of the plurality of light-diffusing portions 341 is approximately aligned to the y-direction. The minor axis direction of the plurality of light-diffusing portions 341 is approximately aligned to the x-direction. According to this, when considering a direction of a reflective surface 341c of each of the light-diffusing portions 341, in the reflective surface 341c of the light-diffusing portion 341, a ratio of the reflective surface 341c along the y-direction is larger than a ratio of the reflective surface 341c along the x-direction. According to this, light Lx that is reflected from the reflective surface 341c along the y-direction and is diffused to the x-direction is more than light Ly that is reflected from the reflective surface 341c along the x-direction and is diffused to the y-direction. Accordingly, an azimuth angle direction in which diffusibility of the light control member 309 is relatively strong becomes the X-direction that is the minor axis direction of the light-diffusing portion 341.

In this embodiment, the light control member 309 is disposed on a light emission side of the liquid crystal panel 2. In addition, at the central portion in a thickness direction of the liquid crystal layer 11 during application of a voltage to the liquid crystal panel 2 of the light control member 309, an azimuth angle direction (a direction in which the azimuth angle φ is 0° or 180°) in which the liquid crystal molecule 51 falls down, and an azimuth angle direction (the x-direction that is the minor axis direction of the light-diffusing portion 341) in which the diffusibility of the light control member 309 is relatively strong are made to approximately match each other.

Even in a case of using the light control member 309, a variation in the gamma characteristics when obliquely viewing the display screen in a direction in which the azimuth angle φ is 0° or 180° is suppressed, and thus it is possible to realize a display image that is excellent in the viewing angle characteristics.

In addition, the planar shape of the light-diffusing portion 341 may include shapes such as a circular shape, a polygonal shape, and a semi-circular shape. In addition, parts of the openings of the light-diffusing portion 341 may be formed to overlap each other.

[Third Embodiment]

Hereinafter, a third embodiment of the invention will be described with reference to FIGS. 14A to 14F.

The basic configuration of a liquid crystal display device of this embodiment is the same as in the first embodiment except that the shape of the light-shielding layer in the light control member is a shape that is inscribed in an ellipse.

Accordingly, in this embodiment, description of the basic configuration of the liquid crystal display device will be omitted, and the light-shielding layer will be described.

FIGS. 14A to 14F are plan views of the light-shielding layer of this embodiment.

As illustrated in FIGS. 14A to 14F, the shape of the light-shielding layer of this embodiment is a shape that is inscribed in an ellipse.

Figure 14A:
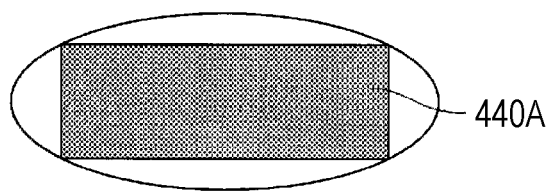
FIG. 14A is a plan view of a light-shielding layer according to a third embodiment of the invention.
Figure 14B:
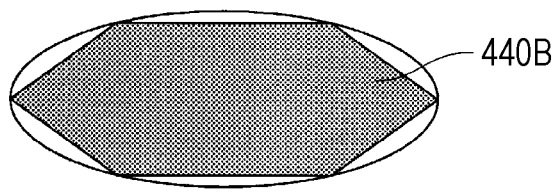
FIG. 14B is a plan view of the light-shielding layer according to the third embodiment of the invention.
Figure 14C:
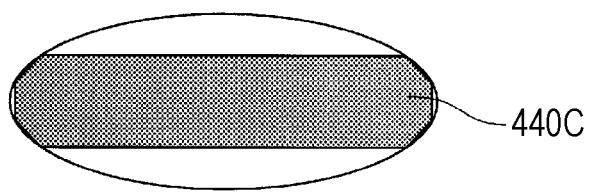
FIG. 14C is a plan view of the light-shielding layer according to the third embodiment of the invention.
Figure 14D:
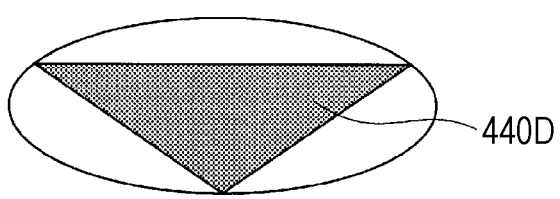
FIG. 14D is a plan view of the light-shielding layer according to the third embodiment of the invention.
Figure 14E:
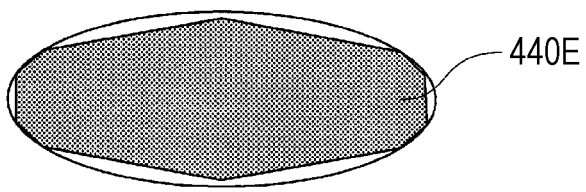
FIG. 14E is a plan view of the light-shielding layer according to the third embodiment of the invention.
Figure 14F:
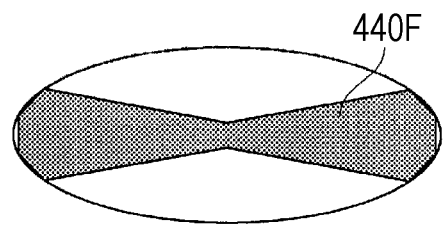
FIG. 14F is a plan view of the light-shielding layer according to the third embodiment of the invention.
Figure 15A:
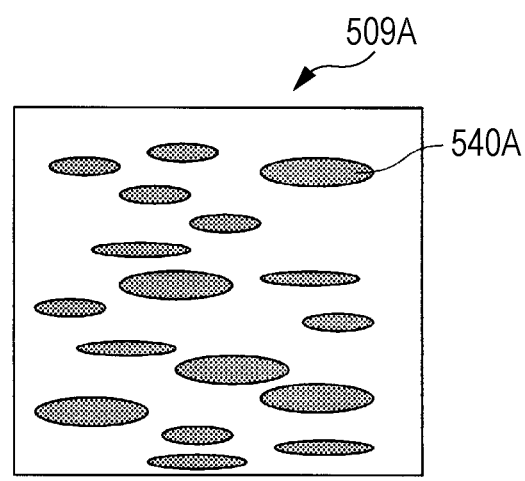
FIG. 15A is a plan view of a light control member according to a fourth embodiment of the invention.
Figure 15B:
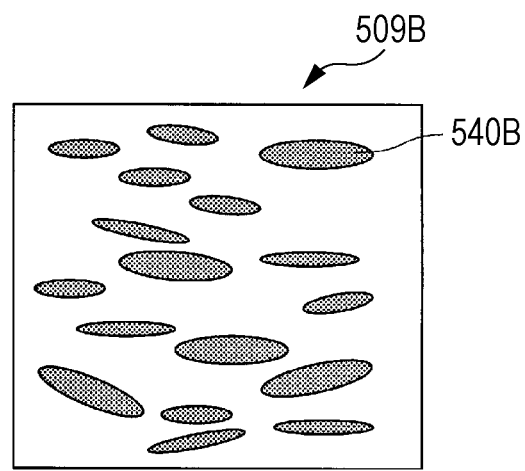
FIG. 15B is a plan view of the light control member according to the fourth embodiment of the invention.
Figure 15C:
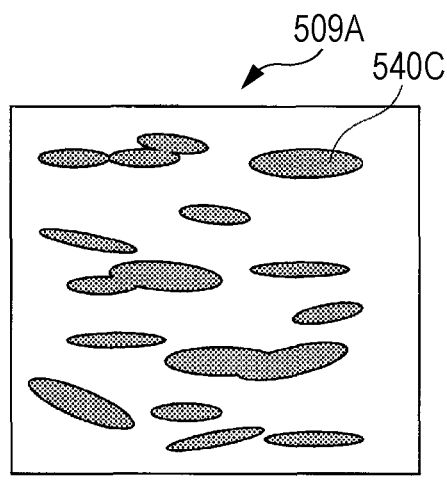
FIG. 15C is a plan view of the light control member according to the fourth embodiment of the invention.
Figure 15D:
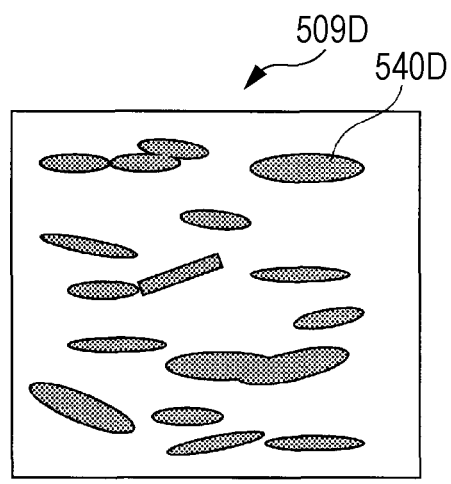
FIG. 15D is a plan view of the light control member according to the fourth embodiment of the invention.

Specifically, a shape of a light-shielding layer 440A illustrated in FIG. 14A is a rectangular shape that is inscribed in an ellipse. A shape of a light-shielding layer 440B illustrated in FIG. 14B is a hexagonal shape that is inscribed in an ellipse. A shape of a light-shielding layer 440C illustrated in FIG. 14C is an octagonal shape that is inscribed in an ellipse. A shape of a light-shielding layer 440D illustrated in FIG. 14D is a triangular shape that is inscribed in an ellipse. A shape of a light-shielding layer 440E illustrated in FIG. 14E is a decagonal shape that is inscribed in an ellipse. A shape of a light-shielding layer 440F illustrated in FIG. 14F is a shape that is inscribed in an ellipse. The central portion of the light-shielding layer 440F is narrower than a portion that is inscribed in the ellipse.

In this embodiment, the minor axis direction of the light-shielding layers 440A to 440F, and the azimuth angle direction (a direction in which the azimuth angle φ is 0° or 180°) in which the liquid crystal molecule 51 falls down during application of a constant voltage to the liquid crystal panel 2 of the light control member 309 are made to approximately match each other.

Even when using the light-shielding layers 440A to 440F of this embodiment, a variation in the gamma characteristics when obliquely viewing the display screen in a direction in which the azimuth angle φ is 0° or 180° is suppressed, and thus it is possible to realize a display image that is excellent in the viewing angle characteristics.

[Fourth Embodiment]

Hereinafter, a fourth embodiment of the invention will be described with reference to FIGS. 15A to 15D.

The basic configuration of a liquid crystal display device of this embodiment is the same as in the first embodiment except for a configuration of the light-shielding layer in the light control member.

Accordingly, in this embodiment, description of the basic configuration of the liquid crystal display device will be omitted, and the light control member will be described.

FIGS. 15A to 15D are plan views of the light control member of this embodiment.

As illustrated in FIGS. 15A to 15D, the light control member of this embodiment is different from the light control member of the first embodiment in a configuration of the light-shielding layer.

Specifically, in the light control member 9 of the first embodiment, a ratio of the length of the minor axis to the length of the major axis is approximately the same in each of the light-shielding layers 40. In contrast, in a light control member 509A illustrated in FIG. 15A, light-shielding layers 540A, in which ratios of the length of the minor axis to the length of the major axis are different from each other, are mixed-in.

In addition, in the light control member 9 of the first embodiment, the major axis direction of each of the light-shielding layers 40 is arranged in a direction in which the azimuth angle φ is 90° or 270°. In contrast, in a light control member 509B illustrated in FIG. 15B, the major axis of parts of a plurality of light-shielding layers 540B extends in a direction different from a direction of the major axis of other light-shielding layers 540B.

In addition, in the light control member 9 of the first embodiment, all of the plurality of light-shielding layers 40 are arranged in a scattered manner. In contrast, in a light control member 509C illustrated in FIG. 15C, parts of a plurality of light-shielding layers 540C are connected to each other.

In addition, in the light control member 9 of the first embodiment, the shape of all of the plurality of light-shielding layers 40 is an elliptical shape. In contrast, in a light control member 509D illustrated in FIG. 15D, parts of a plurality of light-shielding layers 540D have a rectangular shape.

Even when using the light control members 509A to 509D of this embodiment, a variation in the gamma characteristics when obliquely viewing the display screen in a direction in which the azimuth angle φ is 0° or 180° is suppressed, and thus it is possible to realize a display image that is excellent in the viewing angle characteristics.

[Fifth Embodiment]

Hereinafter, a fifth embodiment of the invention will be described with reference to FIG. 16A, FIG. 16B, FIG. 17A, and FIG. 17B.

The basic configuration of a liquid crystal display device of this embodiment is the same as in the first embodiment except for a configuration of the reflective surface of the light-diffusing portion in the light control member.

Accordingly, in this embodiment, description of the basic configuration of the liquid crystal display device will be omitted, and the light control member will be described.

Figure 16A:
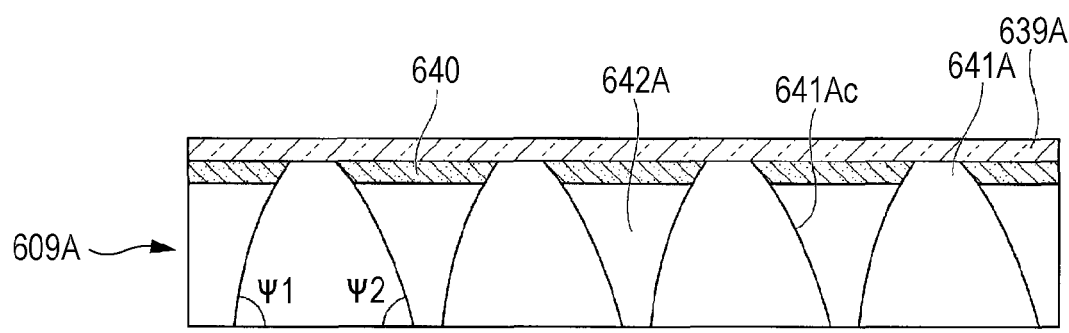
FIG. 16A is a cross-sectional view of a light control member according to a fifth embodiment of the invention.
Figure 16B:
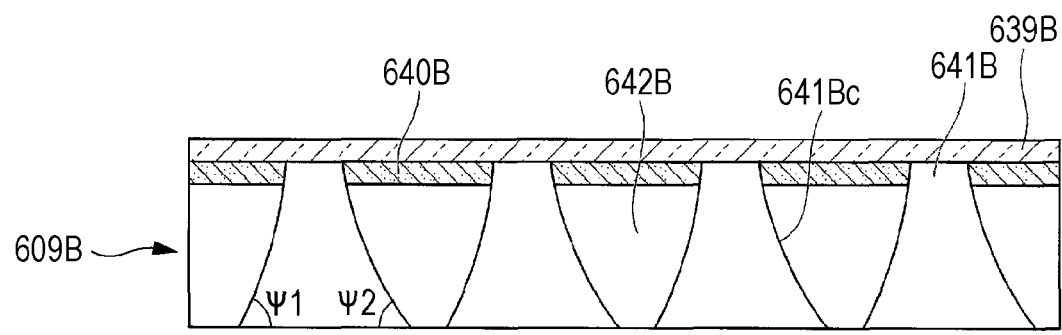
FIG. 16B is a cross-sectional view of the light control member according to the fifth embodiment of the invention.

FIGS. 16A and 16B are cross-sectional views of light control members 609A and 609B of this embodiment.

As illustrated in FIGS. 16A and 16B, the light control members 609A and 609B of this embodiment are different from the light control member 9 of the first embodiment in the configuration of the reflective surface of light-diffusing portions 641A and 641B.

Specifically, in the light control member 9 of the first embodiment, the inclination angle of the reflective surface 41c of each of the light-diffusing portions 40 is constant. In contrast, in the light control members 609A and 609B illustrated in FIGS. 16A and 16B, an inclination angle of a reflective surface of each of the light-diffusing portions 641A and 641B continuously varies. The reflective surface of each of the light-diffusing portions 641A and 641B is an inclined surface having a curved cross-sectional shape.

In the light control member 609A illustrated in FIG. 16A, a reflective surface 641Ac of the light-diffusing portion 641A is curved toward a hollow portion 642A side, and a portion on a reflective surface 641Ac side of the hollow portion 642A is formed in a concave shape.

In the light control member 609B illustrated in FIG. 16B, a reflective surface 641Bc of the light-diffusing portion 641B is curved toward a hollow portion 642B side, and a portion on a reflective surface 641Bc side of the hollow portion 642B is formed in a convex shape.

Figure 17A:
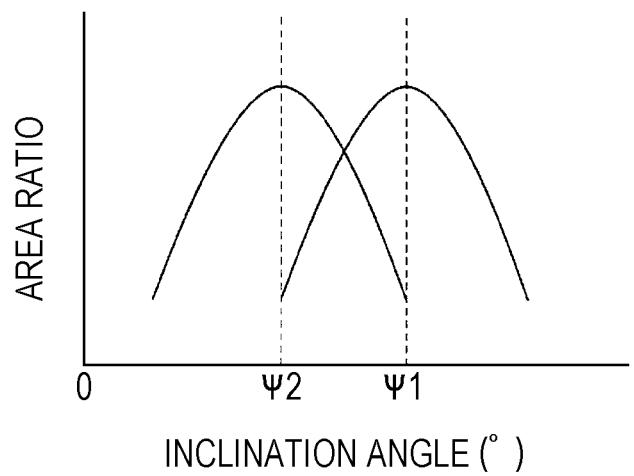
FIG. 17A is a view illustrating a relationship between an inclination angle of a reflective surface of a light-diffusing portion and an area ratio.
Figure 17B:
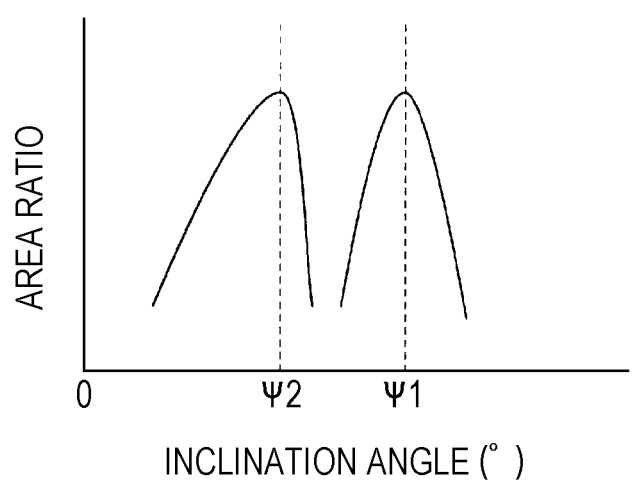
FIG. 17B is a view illustrating a relationship between the inclination angle of the reflective surface of the light-diffusing portion and the area ratio.

FIGS. 17A and 17B are views illustrating a relationship between the inclination angle of the reflective surface of the light-diffusing portion and an area ratio.

FIG. 17A is a view illustrating a case where an inclination angle distribution of the reflective surface of the light-diffusing portion is the same in each of a first reflective surface and a second reflective surface. FIG. 17B is a view illustrating a case where the inclination angle distribution of the reflective surface of the light-diffusing portion is different in each of the first reflective surface and the second reflective surface. In FIGS. 17A and 17B, the horizontal axis represents the inclination angle of the reflective surface of the light-diffusing portion. The vertical axis represents an area ratio of the reflective surface of the light-diffusing portion. The area ratio represents a ratio of an area of a portion having a predetermined inclination angle to a total area of the entirety of the reflective surface when viewing the reflective surface of the light-diffusing portion from a lateral side. In this embodiment, the reflective surface is curved, and thus the inclination angle becomes an angle made by a tangential line at a predetermined position of a curved portion of the reflective surface, and the light-incident end surface of the light-diffusing portion. Here, description will be made with respect to a case where an inclination angle $\psi 1$ of the first reflective surface is larger than an inclination angle $\psi 2$ of the second inclined surface as an example.

In this embodiment, the inclination angle of the reflective surface of the light-diffusing portion has an angle distribution width centering around a main inclination angle. As illustrated in FIG. 17A, the inclination angle distribution of the reflective surface of the light-diffusing portion may be the same inclination distribution in each of the inclination angle $\psi 1$ of the first reflective surface and the inclination angle $\psi 2$ of the second reflective surface. In addition, as illustrated in FIG. 17B, the inclination angle distribution may be a different inclination distribution in each of the inclination angle $\psi 1$ of the first reflective surface and the inclination angle $\psi 2$ of the second reflective surface.

However, with regard to contribution to the degree of contribution to symmetry in a luminance distribution, the inclination angle $\psi 1$ of the first reflective surface has great contribution thereto in comparison to the inclination angle $\psi 2$ of the second reflective surface. According to this, it is desirable that the distribution of the inclination angle $\psi 1$ of the first reflective surface is narrow to improve the symmetry in the luminance distribution.

Even when using the light control members 609A and 609B of this embodiment, a variation in the gamma characteristics when obliquely viewing the display screen in a direction in which the azimuth angle φ is 0° or 180° is suppressed, and thus it is possible to realize a display image that is excellent in the viewing angle characteristics.

[Sixth Embodiment]

Hereinafter, a sixth embodiment of the invention will be described with reference to FIGS. 18A and 18B.

The basic configuration of a liquid crystal display device of this embodiment is the same as in the fifth embodiment except for the configuration of the reflective surface of the light-diffusing portion in the light control member.

Accordingly, in this embodiment, description of the basic configuration of the liquid crystal display device will be omitted, and the light control member will be described.

Figure 18A:
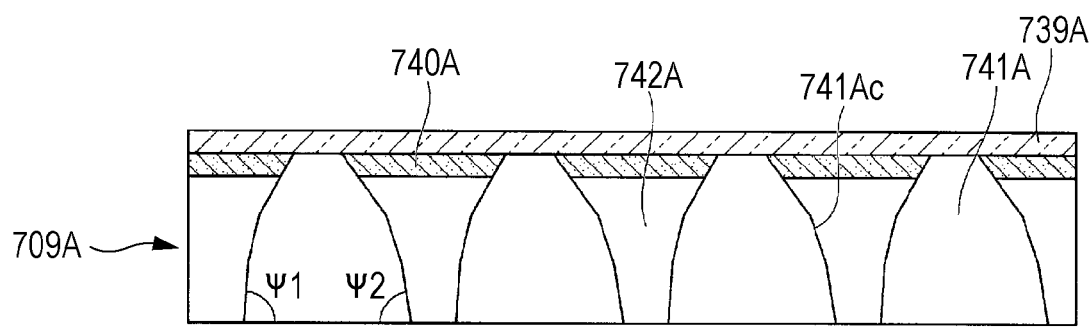
FIG. 18A is a cross-sectional view of a light control member according to a sixth embodiment of the invention.
Figure 18B:
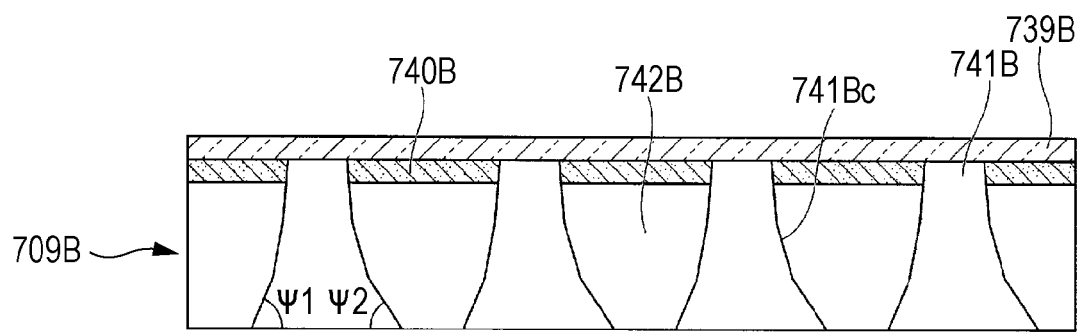
FIG. 18B is a cross-sectional view of the light control member according to the sixth embodiment of the invention.

FIGS. 18A and 18B are cross-sectional views of light control members 709A and 709B of this embodiment.

As illustrated in FIGS. 18A and 18B, the light control members 709A and 709B of this embodiment are different from the light control members 609A and 609B of the fifth embodiment in the configuration of the reflective surface of the light-diffusing portion.

Specifically, in the light control members 609A and 609B of the fifth embodiment, the inclination angle of the reflective surface of each of the light-diffusing portions 641A and 641B continuously varies, and the reflective surface of each of the light-diffusing portions 641A and 641B is an inclined surface having a curved cross-sectional shape. In contrast, in the light control members 709A and 709B illustrated in FIGS. 18A and 18B, the reflective surface of each of the light-diffusing portions 741A and 741B has a plurality of inclination angles different from each other. The reflective surface of each of the light-diffusing portions 741A and 741B is an inclined surface having a bent-line cross-sectional shape.

In the light control member 709A illustrated in FIG. 18A, a reflective surface 741Ac of the light-diffusing portion 741A has three inclined surfaces in which inclination angles are different from each other, and a portion on a reflective surface 741Ac side of a hollow portion 742A is formed in a concave shape.

In the light control member 709B illustrated in FIG. 18B, a reflective surface 741Bc of the light-diffusing portion 741B has three inclined surfaces in which inclination angles are different from each other, and a portion on a reflective surface 741Bc side of a hollow portion 742B is formed in a convex shape.

Even when using the light control member of this embodiment, gray scale reversal when viewing the display screen in an oblique direction is suppressed, and thus it is possible to obtain display that is excellent in viewing angle characteristics.

[Seventh Embodiment]

Hereinafter, a seventh embodiment of the invention will be described with reference to FIGS. 19 to 22.

The basic configuration of a liquid crystal display device of this embodiment is the same as in the first embodiment except for the configuration of the pixel of the liquid crystal panel 2. The liquid crystal panel 2 of this embodiment has a pixel configuration that employs a so-called multi-pixel operation.

Accordingly, in this embodiment, description of the basic configuration of the liquid crystal display device will be omitted, and the pixel of the liquid crystal panel 2 will be described.

Figure 19:
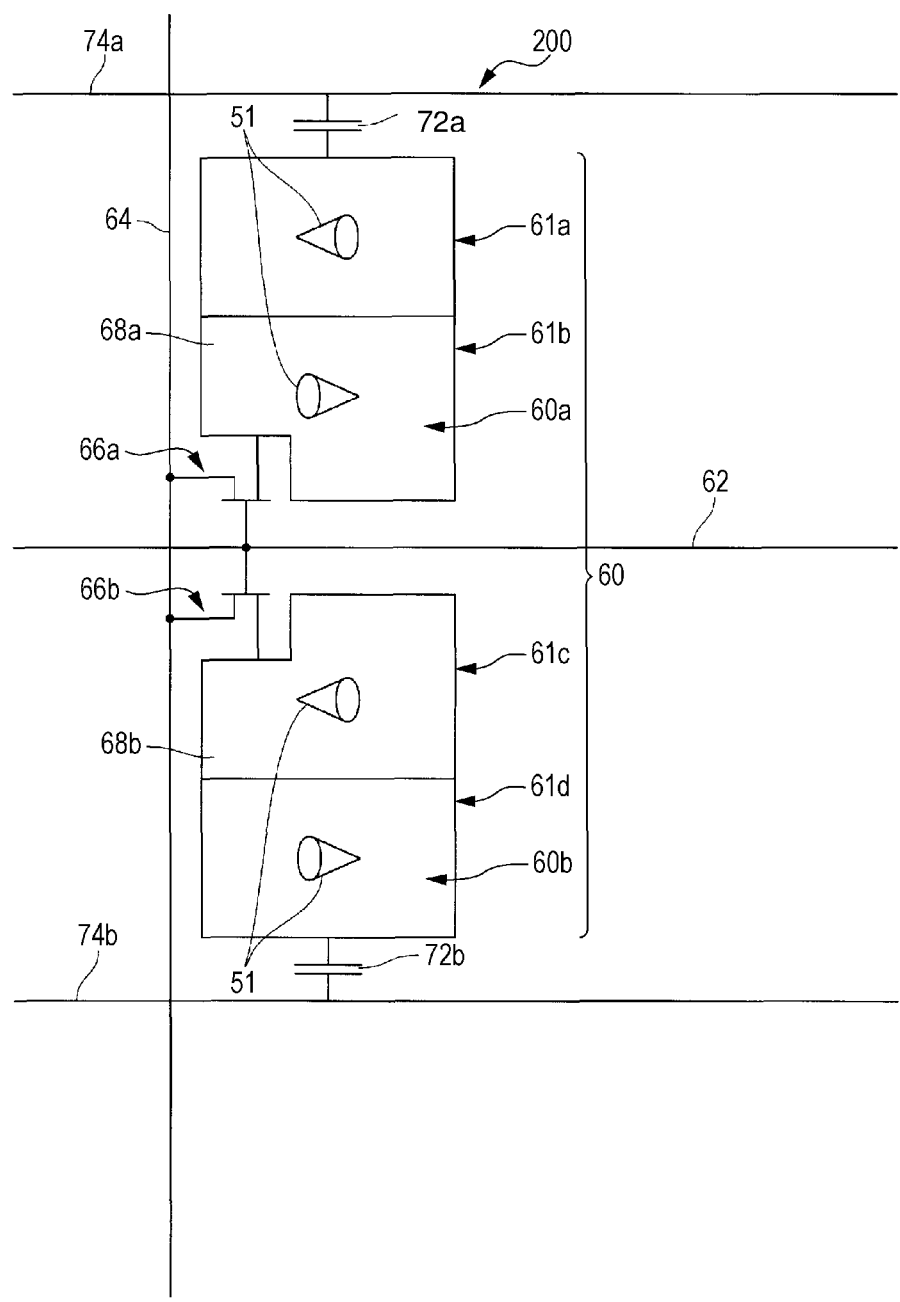
FIG. 19 is a schematic view illustrating an electrical configuration of a liquid crystal display device according to a seventh embodiment of the invention.

FIG. 19 schematically illustrates an electrical configuration of a liquid crystal display device 200 of this embodiment.

A pixel 60 is divided into sub-pixels 60a and 60b. A TFT 66a and an auxiliary capacitor (CS) 72a are connected to the sub-pixel 60a. A TFT 66b and an auxiliary capacitor 72b are connected to the sub-pixel 60b. A gate electrode of each of the TFT 66a and the TFT 66b is connected to a scanning line 62. Each source electrode thereof is connected to a common (same) signal line 64. The auxiliary capacitors 72a and 72b are connected to an auxiliary capacitor interconnection (CS bus line) 74a and an auxiliary capacitor interconnection 74b, respectively. Each of the auxiliary capacitors 72a and 72b is formed by an auxiliary capacitor electrode that is electrically connected to each of sub-pixel electrodes 68a and 68b, an auxiliary capacitor counter electrode that is electrically connected to each of the auxiliary capacitor interconnections 74a and 74b, and an insulating layer (not shown) that is interposed between the electrodes. The auxiliary capacitor counter electrodes of the auxiliary capacitors 72a and 72b are independent from each other, and auxiliary capacitor counter voltages, which are different from each other, can be supplied thereto from the auxiliary capacitor interconnections 74a and 74b, respectively.

The sub-pixel 60a has two domains 61a and 61b. During application of a voltage, a liquid crystal molecule 51 that is included in the domain 61a, and a liquid crystal molecule 51 that is included in the domain 61b fall down in directions different from each other by 180°. Similarly, the sub-pixel 60b has two domains 61c and 61d. During application of a voltage, a liquid crystal molecule 51 that is included in the domain 61c, and a liquid crystal molecule 51 that is included in the domain 61d fall down in directions different from each other by 180°.

Next, description will be made with respect to the principle capable of applying effective voltages, which are different from each other, to liquid crystal layers of the two sub-pixels 60a and 60b of the liquid crystal display device 200 with reference to FIG. 20.

Figure 20:
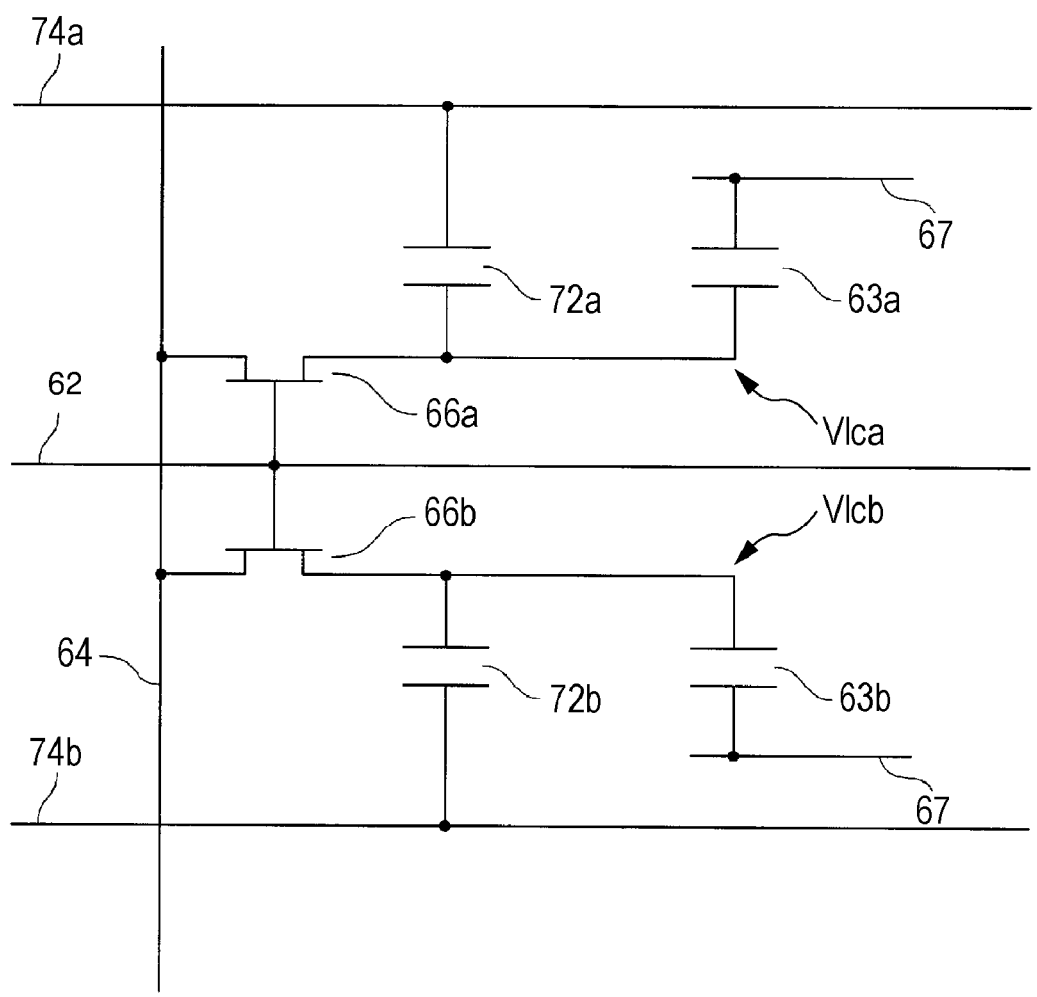
FIG. 20 is an equivalent circuit diagram for one pixel of the liquid crystal display device according to the seventh embodiment of the invention.

FIG. 20 schematically illustrates an equivalent circuit for each pixel of the liquid crystal display device 200. In an electrical equivalent circuit, the liquid crystal layers of the sub-pixels 60a and 60b are illustrated as liquid crystal layers 63a and 63b. In addition, liquid crystal capacitors, which are formed by the sub-pixel electrodes 68a and 68b, the liquid crystal layers 63a and 63b, and a counter electrode 67 (common to the sub-pixels 60a and 60b), are set as Clca and Clcb, respectively.

An electrostatic capacitance value of the liquid crystal capacitors Clca and Clcb is set to the same value CLC (V). The value of CLC (V) depends on an effective voltage (V) that is applied to the liquid crystal layers of the sub-pixels 60a and 60b. In addition, the auxiliary capacitors 72a and 72b, which are independently connected to the liquid crystal capacitors of the sub-pixels 60a and 60b, are set as Ccsa and Ccsb, respectively, and an electrostatic capacitance value thereof is set to the same value CCS.

One electrode of the auxiliary capacitor Ccsa of the sub-pixel 60a is a sub-pixel electrode. The sub-pixel electrode 68a of the liquid crystal capacitor Clca and the sub-pixel electrode of the auxiliary capacitor Ccsa are connected to a drain electrode of the TFT 66a that is provided to drive the sub-pixel 60a. The other electrode of the liquid crystal capacitor Clsa is a counter electrode. The other electrode of the auxiliary capacitor Ccsa is connected to the auxiliary capacitor interconnection 74a. One electrode of the auxiliary capacitor Ccsb of the sub-pixel 60b is a sub-pixel electrode. The sub-pixel electrode 68b of the liquid crystal capacitor Clcb and the sub-pixel electrode of the auxiliary capacitor Ccsb are connected to a drain electrode of the TFT 66b that is provided to drive the sub-pixel 60b. The other electrode of the liquid crystal capacitor Clcb is the counter electrode. The other electrode of the auxiliary capacitor Ccsb is connected to the auxiliary capacitor interconnection 74b. All of the gate electrodes of the TFT 66a and TFT 66b are connected to the scanning line 62. All of the source electrodes thereof are connected to the signal line 64.

Figure 21:
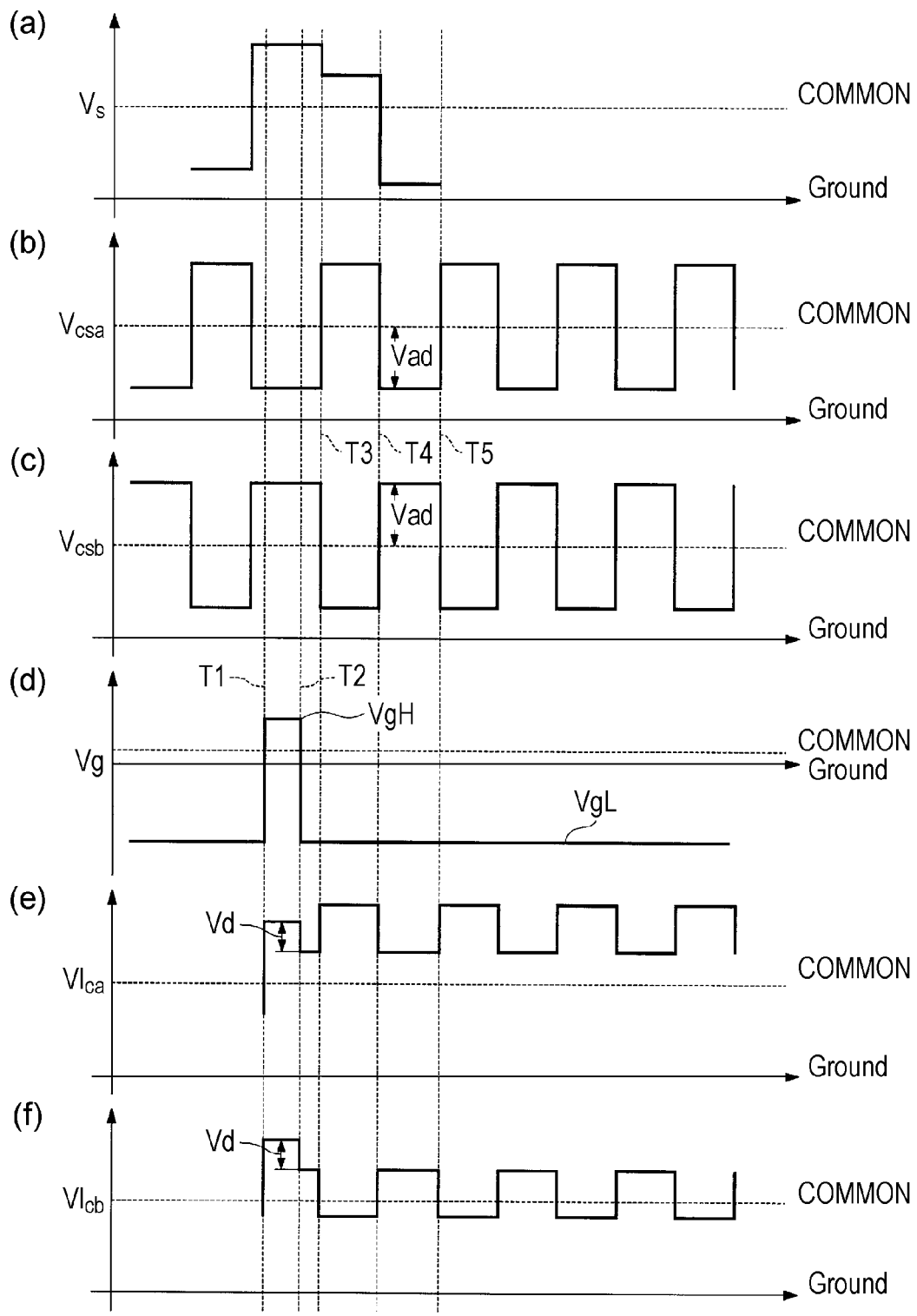
FIG. 21 is a view illustrating a timing chart of each voltage during operation of the liquid crystal display device 200 according to the seventh embodiment of the invention.

A timing of each voltage during operation of the liquid crystal display device 200 of this embodiment is schematically illustrated in (a) to (f) of FIG. 21.

(a) of FIG. 21 illustrates a voltage waveform Vs of the signal line 64. (b) of FIG. 21 illustrates a voltage waveform Vcsa of the auxiliary capacitor interconnection 74a. (c) of FIG. 21 illustrates a voltage waveform Vcsb of the auxiliary capacitor interconnection 74b. (d) of FIG. 21 illustrates a voltage waveform Vg of the scanning line 62. (e) of FIG. 21 illustrates a voltage waveform Vlca of the pixel electrode 68a of the sub-pixel 60a. (f) of FIG. 21 illustrates a voltage waveform Vlcb of the pixel electrode 68b of the sub-pixel 60b. In addition, broken lines in the drawing represents a voltage waveform COMMON (Vcom) of the counter electrode 67.

Hereinafter, an operation of the equivalent circuit of FIG. 20 will be described with reference to (a) to (f) of FIG. 21.

At time T1, when a voltage of Vg varies from VgL to VgH, the TFT 66a, the TFT 66b simultaneously enter a conduction state (ON-state), and thus the voltage Vs of the signal line 64 is transmitted to the sub-pixel electrodes 68a and 68b of the sub-pixels 60a and 60b, and is charged in the sub-pixels 60a and 60b. Similarly, charging from the signal line is also performed in the auxiliary capacitors Csa and Csb of the sub-pixels.

At time T2, when the voltage Vg of the scanning line 62 varies from VgH to VgL, the TFT 66a and the TFT 66b simultaneously enter a non-conduction state (OFF-state), and thus the auxiliary capacitors Csa and Csb of the sub-pixels 60a and 60b are electrically insulated from the signal line 64. In addition, the voltages Vlca and Vlcb of the sub-pixel electrodes decrease by the same voltage Vd immediately after the insulation due to a pull-in phenomenon that is caused by an effect of a parasitic capacitance of the TFT

66a and TFT 66b, and the like. The voltages Vlca and Vlcb are expressed by the following Equations.

$$Vlca = Vs - Vd \quad (1)$$

$$Vlcb = Vs - Vd \quad (2)$$

In addition, the voltages Vcsa and Vcsb of the auxiliary capacitor interconnections are expressed by the following Equations.

$$Vcsa = Vcom - Vad \quad (3)$$

$$Vcsb = Vcom + Vad \quad (4)$$

At time T3, the voltage Vcsa of the auxiliary capacitor interconnection 74a that is connected to the auxiliary capacitor Csa varies from the Vcom−Vad to Vcom+Vad by two times the Vad, and the voltage Vcsb of the auxiliary capacitor interconnection 74b that is connected to the auxiliary capacitor Csb varies from Vcom+Vad to Vcom−Vad by two times the Vad. The voltages Vlca and Vlcb of the sub-pixel electrodes vary as follows in accordance with the voltage variation in the auxiliary capacitor interconnections 74a and 74b.

$$Vlca = Vs - Vd + 2 \times K \times Vad \quad (5)$$

$$Vlcb = Vs - Vd - 2 \times K \times Vad \quad (6)$$

Provided that, a relationship of K=CCS/(CLC (V)+CCS) is established.

At time T4, Vcsa varies from Vcom+Vad to Vcom−Vad, and Vcsb varies from Vcom−Vad to Vcom+Vad by two times the Vad in each case, and thus Vlca and Vlcb vary from Equation (7) and Equation (8) to Equation (9) and Equation (10), respectively.

$$Vlca = Vs - Vd + 2 \times K \times Vad \quad (7)$$

$$Vlcb = Vs - Vd - 2 \times K \times Vad \quad (8)$$

$$Vlca = Vs - Vd \quad (9)$$

$$Vlcb = Vs - Vd \quad (10)$$

At time T5, Vcsa varies from Vcom−Vad to Vcom+Vad, and Vcsb varies from Vcom+Vad to Vcom−Vad by two times the Vad, and thus Vlca and Vlcb also vary from Equation (11) and Equation (12) to Equation (13) and Equation (14), respectively.

$$Vlca = Vs - Vd \quad (11)$$

$$Vlcb = Vs - Vd \quad (12)$$

$$Vlca = Vs - Vd + 2 \times K \times Vad \quad (13)$$

$$Vlcb = Vs - Vd - 2 \times K \times Vad \quad (14)$$

In Vcsa, Vcsb, Vlca, and Vlcb, the variations at T4 and T5 are alternately repeated for an interval that is an integral multiple of horizontal writing time 1 H. Whether or not a repetition interval of the variations at T4 and T5 is set to an interval of one time the interval of 1 H, two times the interval of 1 H, or three or more times the interval of 1 H may be approximately determined in consideration of a method of driving (polarity inverting method and the like) a liquid crystal display device, and a display sate (flickering, feeling of variation in display). The repetition continues until the pixel 60 is subsequently updated, that is, until reaching time that is equivalent to T1. Accordingly, effective values of the voltages Vlca and Vlcb of the sub-pixel electrodes become as follows.

$$Vlca = Vs - Vd + K \times Vad \quad (15)$$

$$Vlcb = Vs - Vd - K \times Vad \quad (16)$$

Accordingly, the effective voltages V1 and V2 which are applied to the liquid crystal layers 13a and 13b of the sub-pixels 60a and 60b are expressed as follows.

$$V1 = Vlca - Vcom \quad (17)$$

$$V2 = Vlcb - Vcom \quad (18)$$

That is, the effective voltages V1 and V2 can be updated as follows.

$$V1 = Vs - Vd + K \times Vad - Vcom \quad (19)$$

$$V2 = Vs - Vd - K \times Vad - Vcom \quad (20)$$

Accordingly, a difference ΔV12 (=V1−V2) between the effective voltages which are applied to the liquid crystal layers 13a and 13b of the sub-pixels 60a and 60b satisfies a relationship of ΔV12=2×K×Vad (provided that, K=CCS/(CLC(v)+CCS)), and thus application of voltages different from each other is possible.

In this embodiment, the light control member 9 is combined with the liquid crystal display device 200 having the above-described configuration. Similar to the first embodiment, the light control member 9 is disposed in such a manner that the direction in which the liquid crystal molecule 51 falls down during application of a voltage, and the minor axis direction of the light-shielding layers 40 of the light control member 9 approximately match each other. As described above, among light beams which are emitted from the light control member 9, the light beam Ly that is scattered in a direction in which the azimuth angle ϕ is 90° or 270° is less. Accordingly, the viewing angle characteristics in a direction in which the azimuth angle ϕ is 90° or 270° is almost not changed from those of the liquid crystal display device that does not include the light control member 9.

On the other hand, among light beams, which are emitted from the light control member 9, the amount of light beams Lx which are scattered in a direction in which the azimuth angle ϕ is 0° or 180° (that is, the minor axis direction of the light-shielding layers 40) is greater than the amount of light beams Ly which are scattered in a direction in which the azimuth angle ϕ is 90° or 270°. That is, light scattering characteristics in a direction in which the azimuth angle ϕ is 0° or 180° are relatively large.

Light beams, which are incident to the light control member 9 at different polar angles θ, are mixed-in by the light control member 9 in a direction in which the azimuth angle ϕ is 0° or 180°. As a result, a difference in luminance variation in a direction in which the azimuth angle ϕ is 0° or 180° is averaged, and thus the variation in gamma characteristics, which depend on the polar angle θ in a direction in which the azimuth angle ϕ is 0° or 180°, is mitigated.

Figure 22:
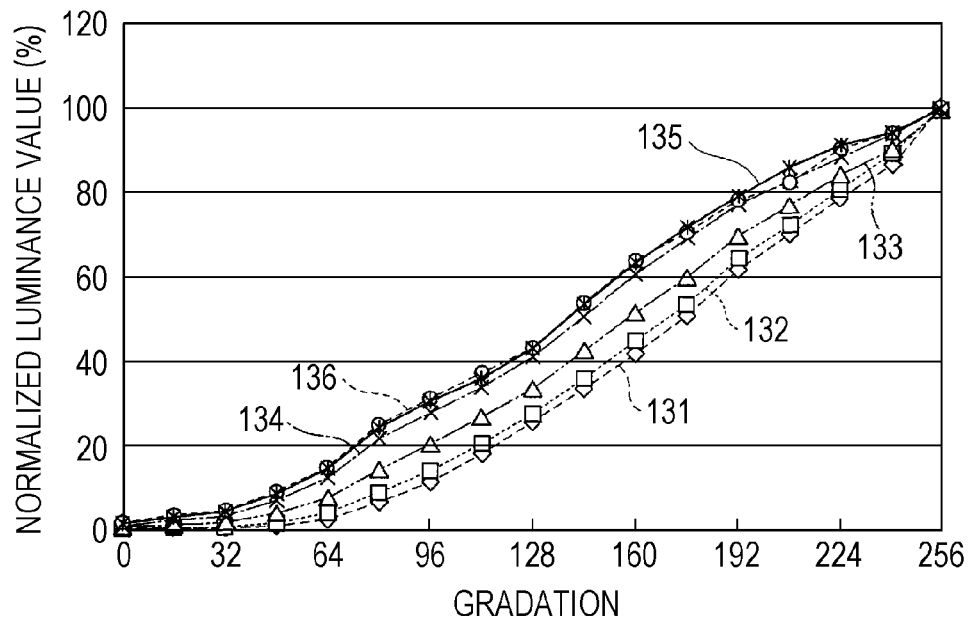
FIG. 22 is a view illustrating gamma characteristics in a case of changing the polar angle θ at the azimuth angle φ of 180° in the liquid crystal display device according to the seventh embodiment of the invention.

FIG. 22 is a view illustrating gamma characteristics in a case of changing the polar angle θ at the azimuth angle ϕ of 180° in the liquid crystal display device 200 according to this embodiment. FIG. 22, the horizontal axis represents a gray scale, and the vertical axis represents a normalized luminance. In FIG. 22, a reference numeral 131 represents gamma characteristics at the polar angle θ of 0°. A reference numeral 132 represents gamma characteristics at the polar angle θ of 15°. A reference numeral 133 represents gamma characteristics at the polar angle θ of 30°. A reference numeral 134 represents gamma characteristics at the polar angle θ of 45°. A reference numeral 135 represents gamma characteristics at the polar angle θ of 60°. A reference numeral 136 represents gamma characteristics at the polar angle θ of 75°. It can be seen that the gamma characteristics at the polar angle θ of 45° or higher becomes closer to the gamma characteristics at the polar angle θ of 0° in comparison to the first embodiment illustrated in FIG. 11. From this result, in the liquid crystal display device 200 including pixels which employ the multi-pixel operation, it can be said that when viewing the liquid crystal display device 200 from an oblique direction at the azimuth angle φ of 180°, a color variation is further mitigated.

In addition, the other multi-pixel operation methods are applicable to this embodiment without limitation to the multi-pixel operation method that is used in this embodiment. For example, pixel configurations, which are described in Japanese Unexamined Patent Application Publication No. 2006-48055, Japanese Unexamined Patent Application Publication No. 2006-133577, Japanese Unexamined Patent Application Publication No. 2009-199067, and International Publication Pamphlet No. WO2008/18552, may be used.

[Eighth Embodiment]

The above-described liquid crystal display devices of the first embodiment to the seventh embodiment are applicable to various electronic apparatuses.

Hereinafter, electronic apparatuses, which include any one of the above-described liquid crystal display devices of the first embodiment to the seventh embodiment, will be described with reference to FIGS. 23 to 25.

Figure 23:
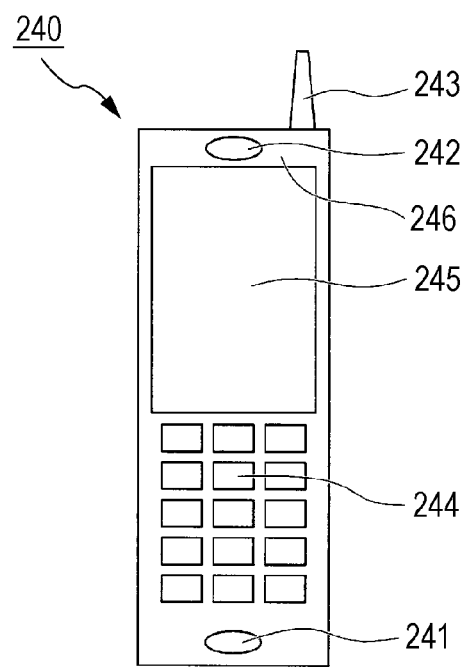
FIG. 23 is an external view illustrating a portable telephone as an application example of the liquid crystal display device according to the first to seventh embodiments.

The above-described liquid crystal display devices of the first embodiment to the seventh embodiment are applicable to, for example, a portable telephone illustrated in FIG. 23.

A portable telephone 240 illustrated in FIG. 23 includes a voice input unit 241, a voice output unit 242, an antenna 243, operation switches 244, a display unit 245, a casing 246, and the like.

The above-described liquid crystal display devices of the first embodiment to the seventh embodiment are appropriately applicable to the display unit 245. When the above-described liquid crystal display devices of the first embodiment to the seventh embodiment are applied to the display unit 245 of the portable telephone 240, it is possible to display an image with less visual angle dependency.

Figure 24:
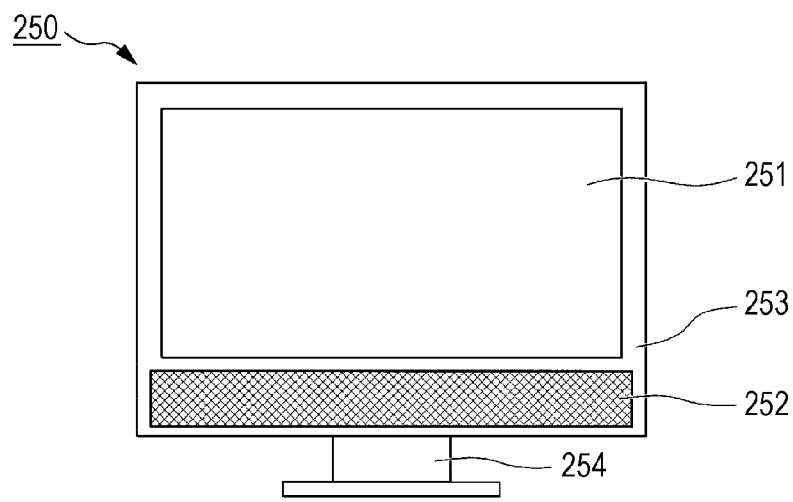
FIG. 24 is an external view illustrating a flat-screen television as an application example of the liquid crystal display device according to the first to seventh embodiments.

In addition, the above-described liquid crystal display devices of the first embodiment to the seventh embodiment are applicable to, for example, a flat-screen television illustrated in FIG. 24.

A flat-screen television 250 illustrated in FIG. 24 includes, a display unit 251, a speaker 252, a cabinet 253, a stand 254, and the like.

The above-described liquid crystal display devices of the first embodiment to the seventh embodiment are appropriately applicable as the display unit 251. When the above-described liquid crystal display devices of the first embodiment to the seventh embodiment are applied to the display unit 251 of the flat-screen television 250, it is possible to display an image with less visual angle dependency.

Figure 25:
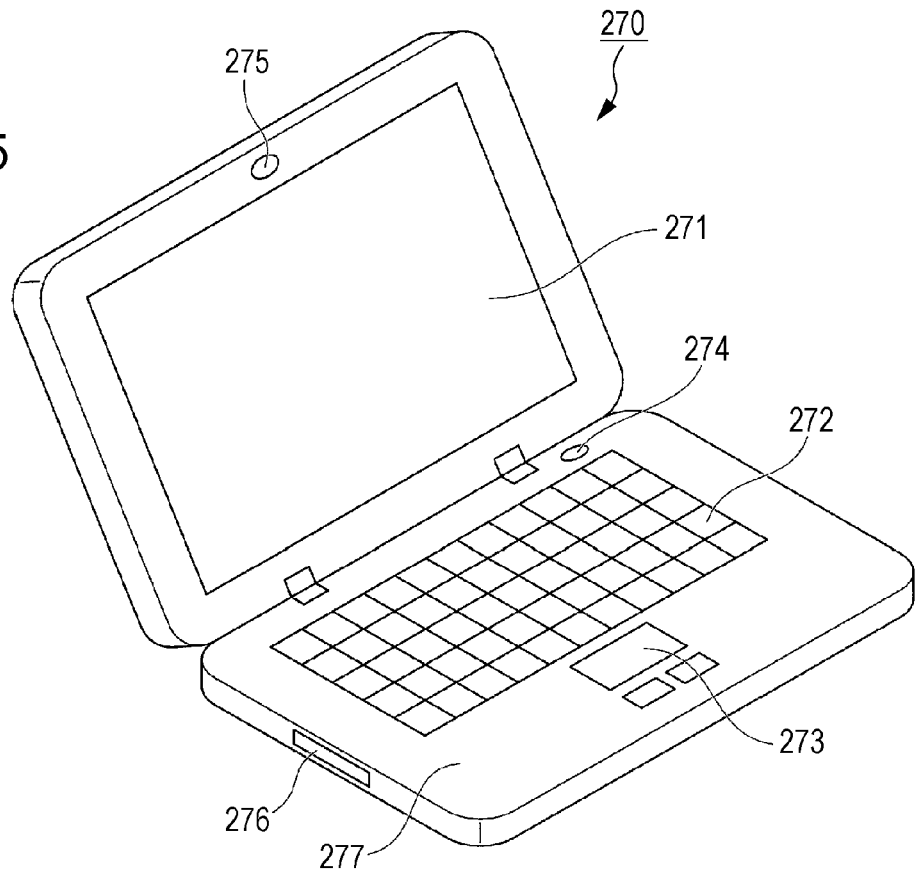
FIG. 25 is an external view illustrating a notebook computer as an application example of the liquid crystal display device according to the first to seventh embodiments.

The above-described liquid crystal display devices of the first embodiment to the seventh embodiment are applicable to, for example, a notebook computer illustrated in FIG. 25.

A notebook computer 270 illustrated in FIG. 25 includes, a display unit 271, a keyboard 272, a touch pad 273, a main switch 274, a camera 275, a recording medium slot 276, a casing 277, and the like.

The above-described liquid crystal display devices of the first embodiment to the seventh embodiment are applicable to the display unit 271. When the above-described liquid crystal display devices of the first embodiment to the seventh embodiment are applied to the display unit 271 of the notebook computer 270, it is possible to display an image with less viewing angle dependency.

In addition, the technical scopes of the several aspects of the invention are not limited to the embodiments, and various modifications can be added in a range not departing from the gist of the aspects of the invention.

For example, the azimuth angle direction in which the variation in the gamma characteristics which depends on the polar angle of the liquid crystal panel is large, and the azimuth angle direction in which diffusibility of the light control member is relatively strong are not desirable to completely match each other, and may approximately match each other.

In general, in an assembly process of the liquid crystal display device, it is considered that a deviation in a rotational direction in positioning of the liquid crystal panel and the light control member is in approximately 3°. According to this, even when the azimuth angle direction in which a luminance viewing angle of the liquid crystal panel is relatively narrow, and the azimuth angle direction in which the diffusibility of the light control member is relatively strong deviates approximately 3°, this case is also included in the technical scope in the aspects of the invention.

In addition, at least one of an anti-reflective layer, a polarizing filter layer, an antistatic layer, an anti-glare treatment layer, and an anti-fouling treatment layer may be provided on the visual recognition side of the base material of the light control member in the above-described embodiments. According to this configuration, in accordance with a kind of layers which are provided on the visual recognition side of the base material, a function of reducing reflection of external light, a function of preventing attachment of dust or contaminant, a function of preventing a damage, and the like can be applied, and thus it is possible to prevent deterioration of visual angle characteristics with the passage of time.

In addition, in the embodiments, the description has been given to a case where the shape of the light-diffusing portion or spatial portion is set to truncated elliptical cone shape, but the other shapes are also possible. In addition, the inclination angle of the reflective surface of the light-diffusing portion may not be symmetrical about an optical axis. In a case where the shape of the light-diffusing portions is set to the truncated elliptical cone shape similar to the above-described embodiments, inclination angles of the reflective surfaces of the light-diffusing portion are line-symmetric about the optical axis, and thus a line-symmetric angle distribution about the optical axis is obtained. In contrast, in a case where an asymmetric angle distribution is intentionally desired in accordance with a usage or a using method of the display device, for example, in a case of desiring to broaden a viewing angle only on an upper side or a right side of a screen, the inclination angles of the reflective surface of the light-diffusing portion may be made to be asymmetric.

In addition, specific configurations relating to materials, the number, disposition, and the like of respective constituent members of the liquid crystal display device are not limited to the above-described embodiments, and may be appropriately modified. For example, in the above-described embodiments, the description has been given to an example in which the polarizing plate or the phase difference plate is disposed on an outer side of the liquid crystal panel. However, instead of the configuration, the polarizing layer or the phase difference layer may be formed on an inner side of a pair of substrates which constitute the liquid crystal panel.

INDUSTRIAL APPLICABILITY

Some aspect of the invention can be applied to a liquid display device.

REFERENCE SIGNS LIST 1, 200 Light source device
2 Liquid crystal panel
8 Backlight
9 Light control member
39 Base material
40 Light-shielding layer
41 Light-diffusing portion

The invention claimed is:

1. A liquid crystal display device, comprising: a liquid crystal panel including a first substrate including a first vertical alignment film, a second substrate including a second vertical alignment film, a liquid crystal layer between the first vertical alignment film and the second vertical alignment film and having a negative dielectric anisotropy, a first polarizing plate on a light incidence side of the liquid crystal layer, and a second polarizing plate on a light emission side of the liquid crystal layer;
   an illuminating device on a light incidence side of the liquid crystal panel that emits light toward the liquid crystal panel; and
   a light control member on a light emission side of the liquid crystal panel that diffuses light that is emitted from the liquid crystal panel in an anisotropic manner in a first azimuth angle direction and a second azimuth angle direction viewed from a normal direction to the liquid crystal panel to control an emission direction of the light, wherein
   the liquid crystal panel includes a plurality of pixels, each of the plurality of pixels being a basic unit of display,
   each of the plurality of pixels includes a first region in which a director of liquid crystal molecules at the central portion in a thickness direction of the liquid crystal layer during application of a voltage heads for a first orientation in a first direction, and a second region in which the director of the liquid crystal molecules at the central portion in the thickness direction of the liquid crystal layer during application of a voltage heads for a second orientation opposite to the first orientation in the first direction,
   the first region and the second region sharing a common side, the common side is parallel to the first direction and formed in between the first region and the second region, and
   the second azimuth angle direction in which light-diffusibility of the light control member is relatively strong approximately matches the first direction.

2. The liquid crystal display device according to claim 1, wherein
   the light control member includes a light-transmissive base material, a light-diffusing portion that is defined on a first surface of the base material, and a light-shielding portion that is defined in a region on the first surface of the base material other than a region in which the light-diffusing portion is defined,
   the light-diffusing portion includes a light-emitting end surface that is located on a base material side, a light-incident end surface that is located on a side opposite to the base material side, and has an area larger than an area of the light-emitting end surface, and an inclined surface that is located between the light-emitting end surface and the light-incident end surface,
   a height of the light-diffusing portion from the light-incident end surface to the light-emitting end surface is higher than a height of the light-shielding portion, and
   a material having a refractive index, which is smaller than a refractive index of the light-diffusing portion, is in a gap between light-diffusing portions which is in a region in which each of the light-diffusing portions is not defined.

3. The liquid crystal display device according to claim 2, wherein a planar shape of the light-shielding portion when viewed from a normal direction of the base material is an anisotropic shape having a major axis and a minor axis.

4. The liquid crystal display device according to claim 3, wherein the planar shape is an elliptical shape.

5. The liquid crystal display device according to claim 4, wherein a ratio of a major axis dimension to a minor axis dimension in the elliptical shape is 1.1 to 2.5.

6. The liquid crystal display device according to claim 3, wherein the planar shape is a polygonal shape that is inscribed in an ellipse.

7. The liquid crystal display device according to claim 2, wherein an angle made by the light-incident end surface and the inclined surface of the light-diffusing portion is 80°±5°.

8. The liquid crystal display device according to claim 2, wherein a ratio of an occupation area of the light-shielding portion to a total area of the first surface of the base material is 30%±10%.

9. The liquid crystal display device according to claim 1, wherein each of the plurality of pixels includes at least a first sub-pixel and a second sub-pixel which are capable of individually controlling an application voltage to the liquid crystal layer.

10. The liquid crystal display device according to claim 1, wherein the first vertical alignment film and the second vertical alignment film are optical alignment films.

* * * * *